US006883281B1

(12) United States Patent
Chavez-Gandara

(10) Patent No.: US 6,883,281 B1
(45) Date of Patent: Apr. 26, 2005

(54) MULTIUSE CONSTRUCTION SYSTEM: MULTISPACE 2000

(76) Inventor: Hector E. Chavez-Gandara, P.O. Box 17-11-6116, Quito (EC)

( * ) Notice: Subject to any disclaimer, the term of this patent is extended or adjusted under 35 U.S.C. 154(b) by 0 days.

(21) Appl. No.: 10/070,679
(22) PCT Filed: Sep. 7, 1999
(86) PCT No.: PCT/CA99/00815
§ 371 (c)(1),
(2), (4) Date: Jul. 15, 2002
(87) PCT Pub. No.: WO01/18317
PCT Pub. Date: Mar. 15, 2001

(51) Int. Cl.[7] .............................. E04B 1/00; E04B 5/00; E04B 7/00
(52) U.S. Cl. ........................................ 52/284; 52/223.7
(58) Field of Search ................................. 52/223.7, 284, 52/604, 605, 606, 610, 611, 293.2

(56) References Cited

U.S. PATENT DOCUMENTS

| | | | | |
|---|---|---|---|---|
| 1,351,471 A | * | 8/1920 | Drabers | 52/436 |
| 1,588,332 A | * | 6/1926 | Peters | 52/436 |
| 2,091,552 A | * | 8/1937 | Maccauley | 52/293.2 |
| 2,141,397 A | * | 12/1938 | Locke | 52/204.2 |
| 2,684,589 A | * | 7/1954 | Perreton | 52/591.2 |
| 3,478,482 A | * | 11/1969 | Weir | 52/592.3 |
| 3,736,709 A | * | 6/1973 | Koch et al. | 52/97 |
| 3,881,289 A | * | 5/1975 | Mauroner | 52/259 |
| 4,319,440 A | * | 3/1982 | Rassias et al. | 52/438 |
| 4,620,404 A | * | 11/1986 | Rizk | 52/602 |
| 4,741,135 A | * | 5/1988 | Baena | 52/223.7 |
| 5,186,883 A | * | 2/1993 | Beall, III | 264/275 |
| 5,531,054 A | * | 7/1996 | Ramirez | 52/741.1 |
| 5,787,675 A | * | 8/1998 | Futagi | 52/745.1 |
| 5,802,797 A | * | 9/1998 | Storer-Folt | 52/604 |
| 5,890,332 A | * | 4/1999 | Skidmore et al. | 52/271 |
| 6,085,476 A | * | 7/2000 | Jantzi et al. | 52/223.7 |
| 6,389,758 B1 | * | 5/2002 | Martin, Jr. | 52/125.2 |

* cited by examiner

Primary Examiner—Ramon O. Ramirez
Assistant Examiner—Amy J. Sterling
(74) Attorney, Agent, or Firm—Simpson & Simpson, PLLC

(57) ABSTRACT

Disclosed is a modular building system and method of building an expandable building. There is a visible foundation comprising structural beam elements of reinforced concrete having a plurality of foundation rods extending upwardly therefrom and a plurality of modular blocks for forming walls of the building extending upwardly from the foundation beam elements. The blocks have vertical apertures therethrough and are adapted to be assembled into the walls such that a plurality of vertical ducts are formed in the walls by the apertures of adjacently assembled blocks. Wall rods having upper and lower ends with the lower ends of the wall rods being connectable to the foundation beam rods at selected locations thereof and adapted to extend upwardly through selected ones of the assembled wall ducts. At least some of the wall rods are of a height where the upper ends are exposed above an assembled wall.

18 Claims, 30 Drawing Sheets

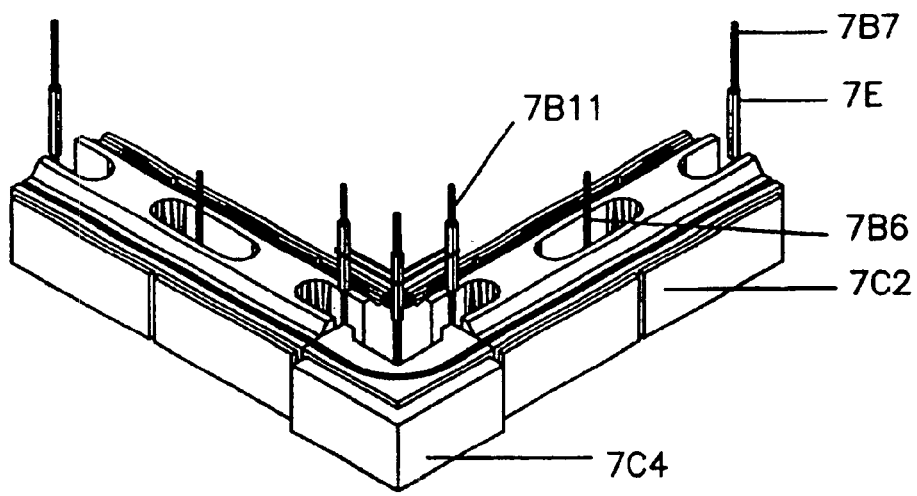
FIG.3(a)
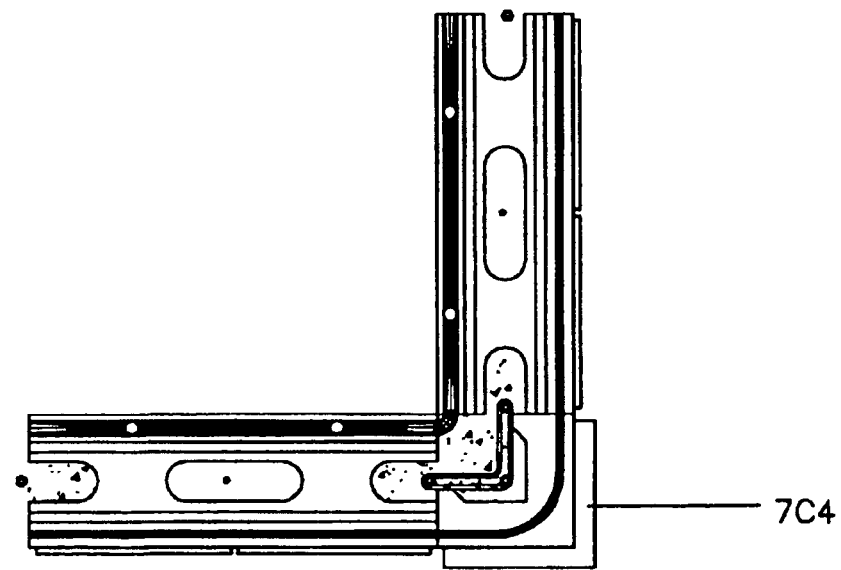
FIG.3(b)
FIG.3

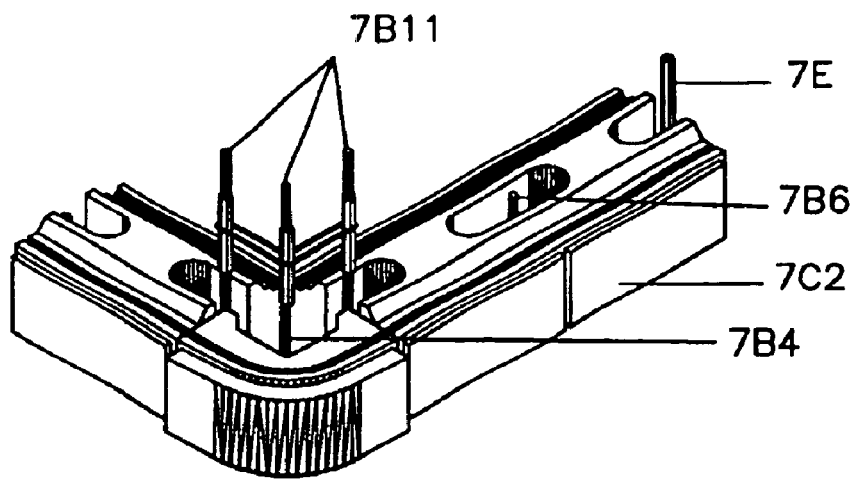
FIG.4(a)
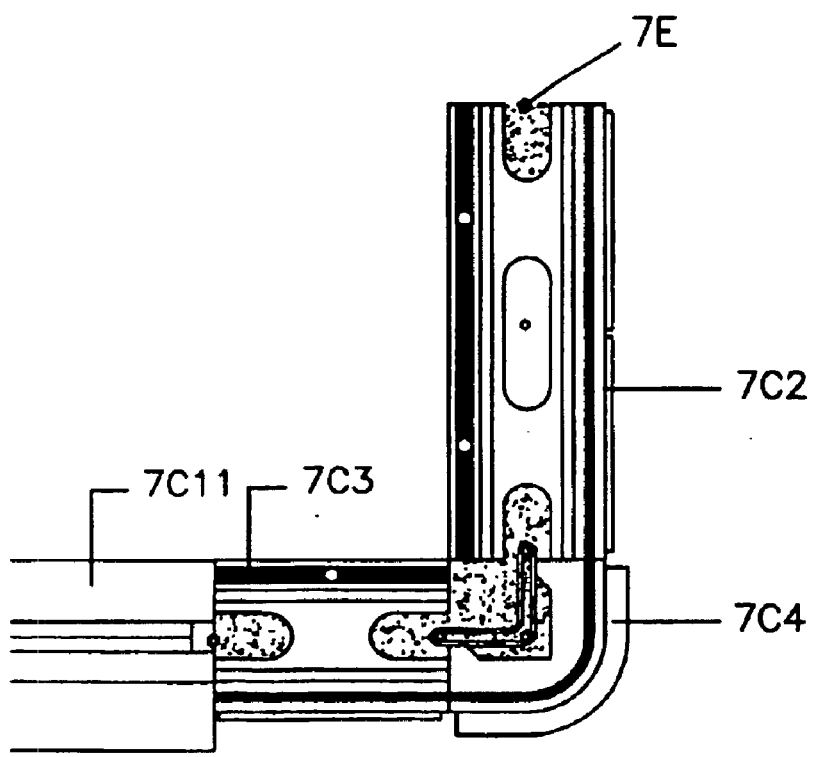
FIG.4(b)
FIG.4

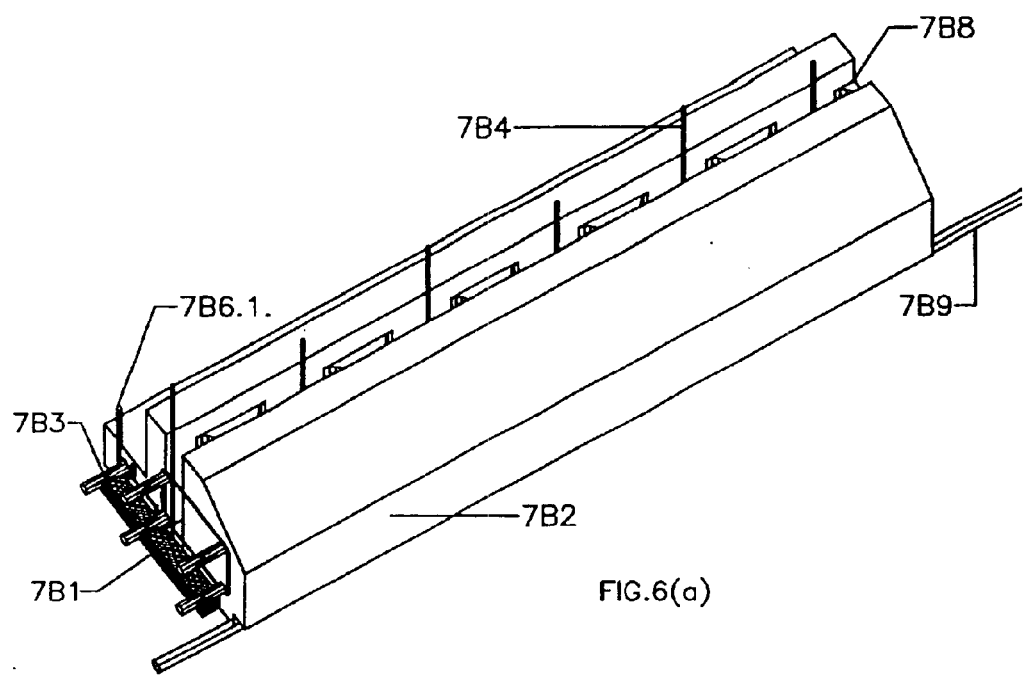
FIG.6(a)
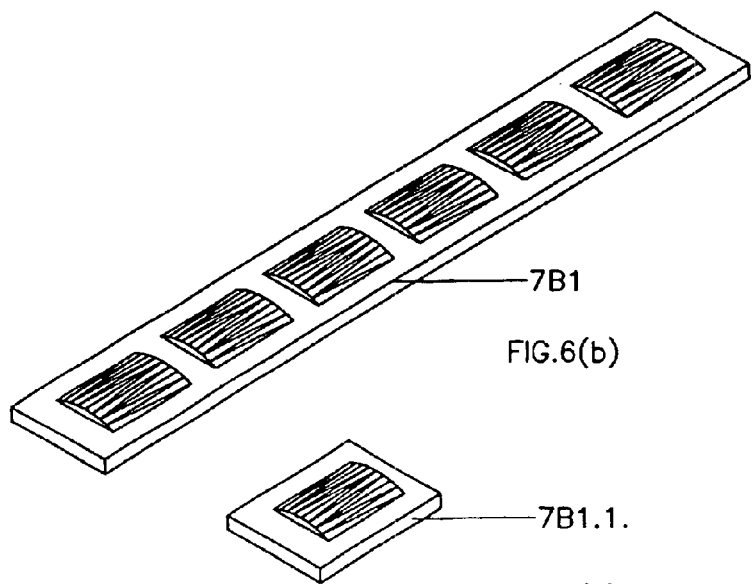
FIG.6(b)
FIG.6(c)
FIG.6

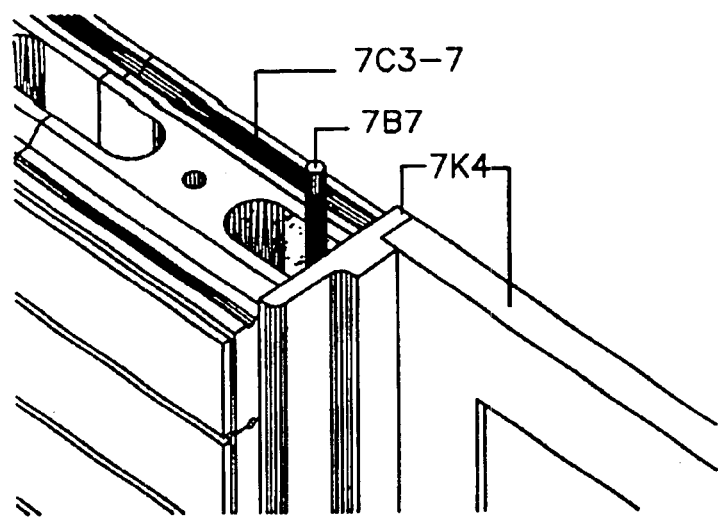
FIG.11(b)
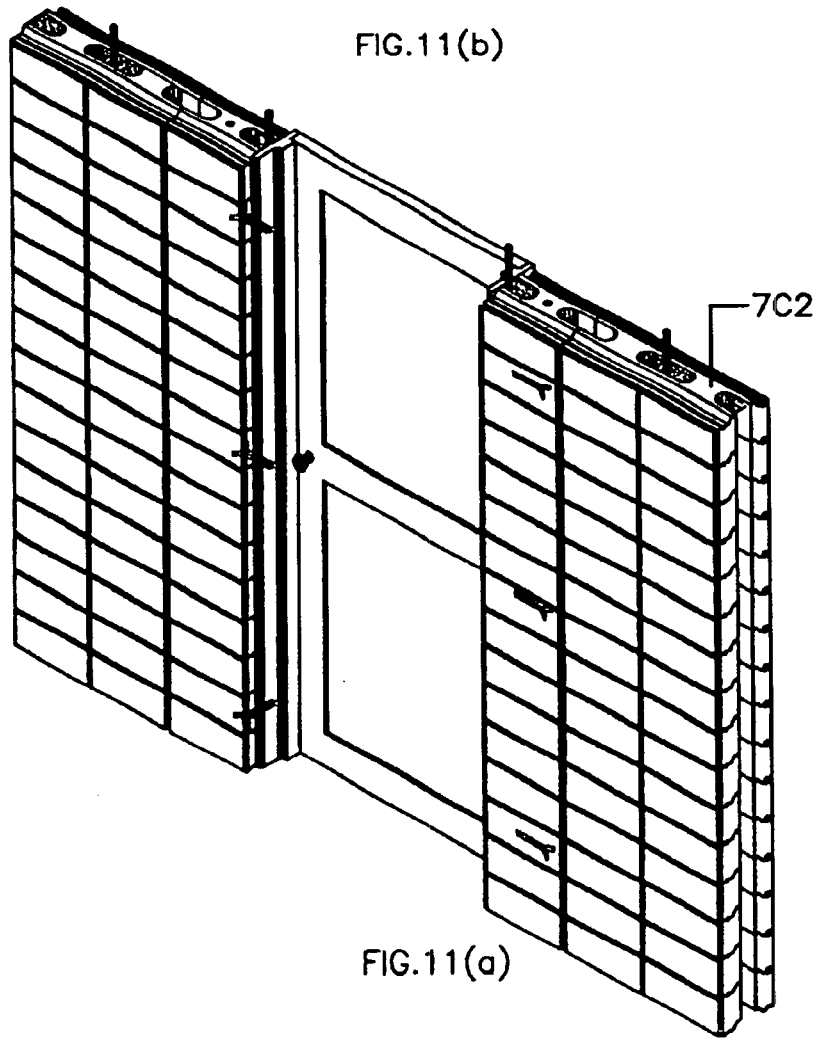
FIG.11(a)
FIG.11.

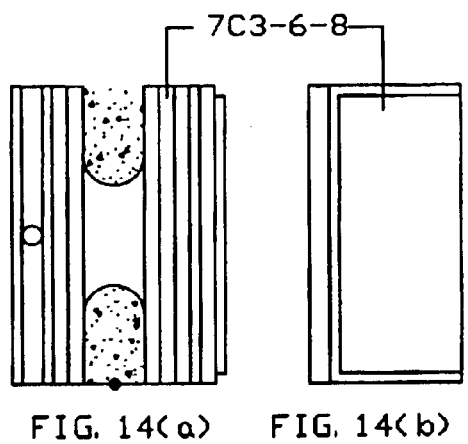
FIG. 14(a)    FIG. 14(b)
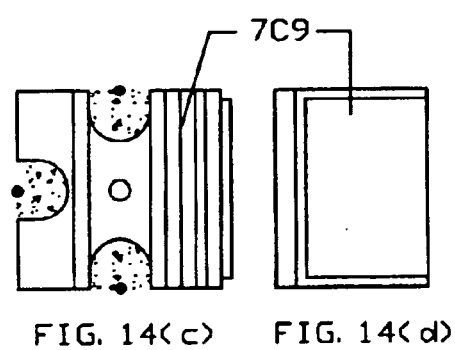
FIG. 14(c)    FIG. 14(d)
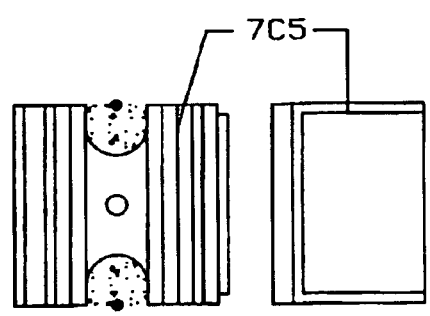
FIG. 14(e)    FIG. 14(f)
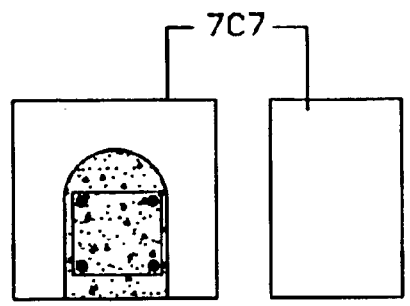
FIG. 14(g)    FIG. 14(h)
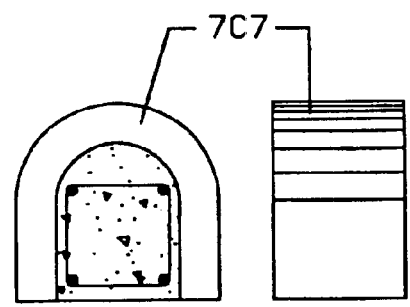
FIG. 14(i)    FIG. 14(j)
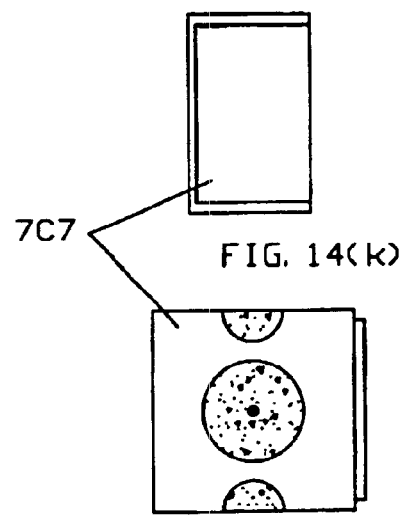
FIG. 14(k)
FIG. 14(l)
FIG. 14

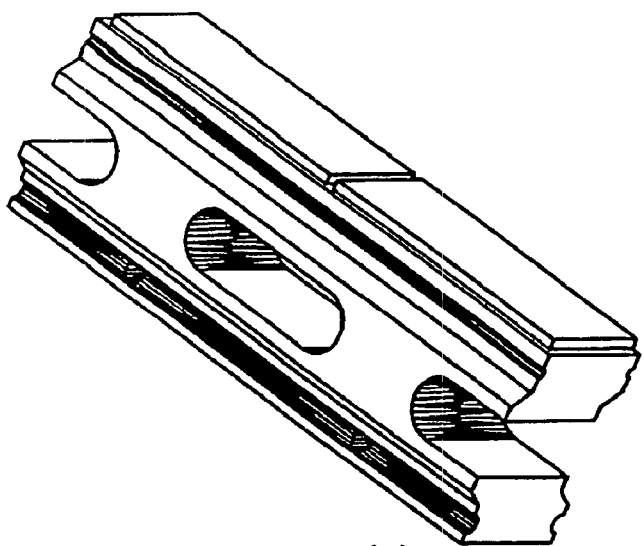
FIG.15(d)
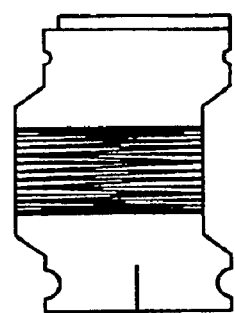
FIG.15(c)
7C2
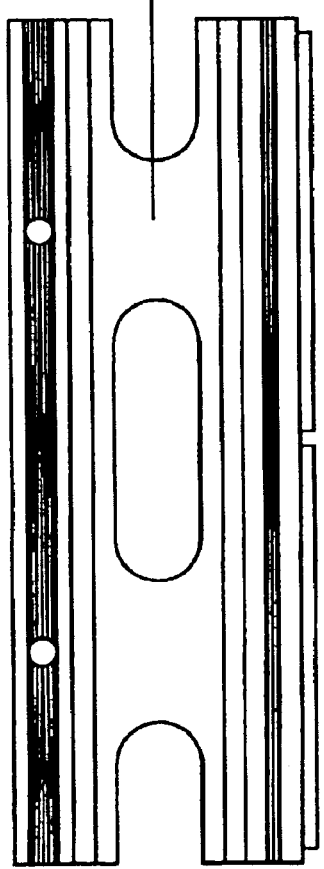
FIG.15(a)
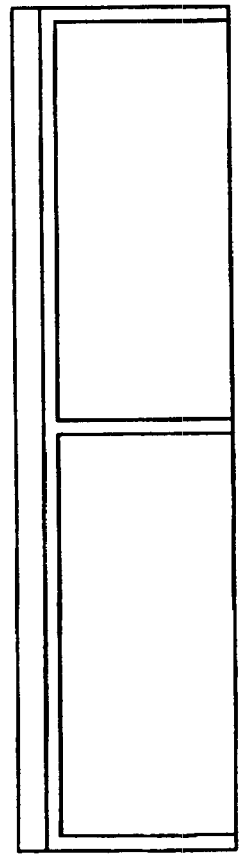
FIG.15(b)
FIG.15

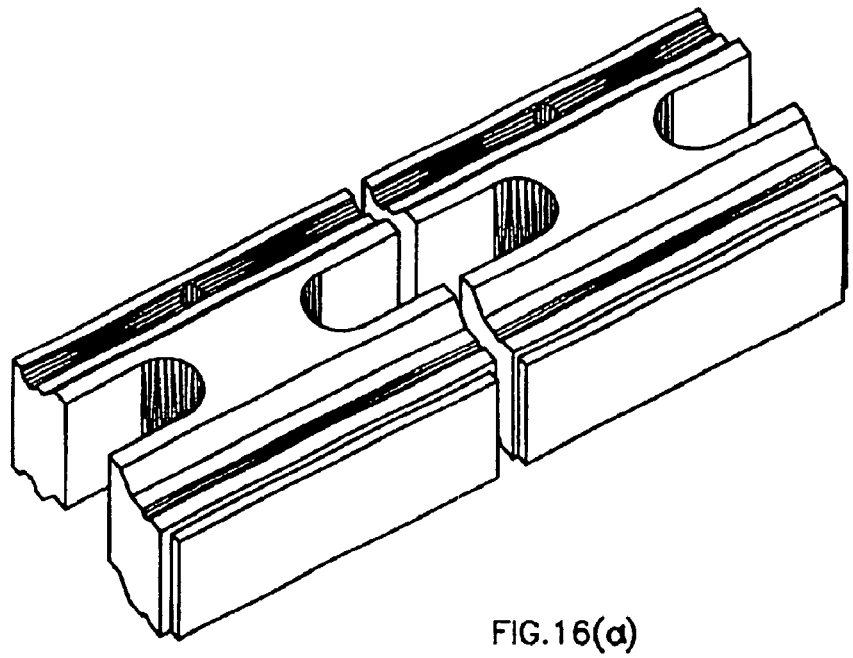
FIG.16(a)
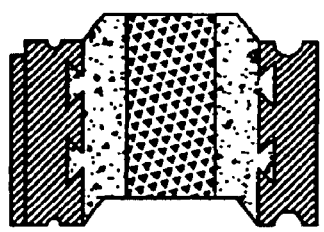
FIG.16(b)
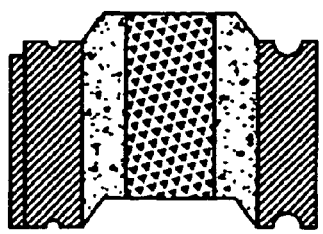
FIG.16(c)
FIG.16

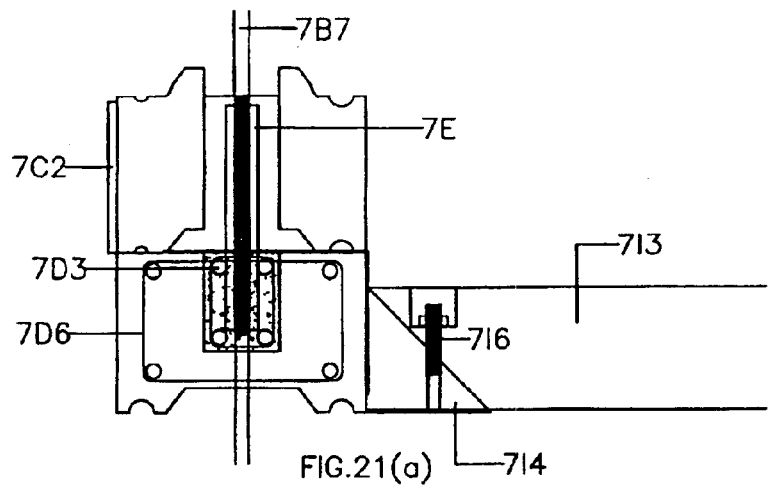
FIG.21(a)
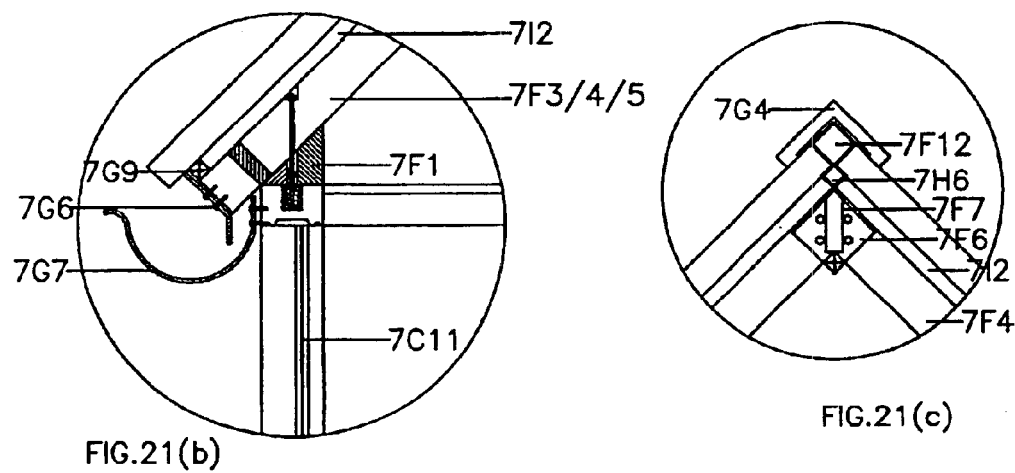
FIG.21(b)
FIG.21(c)
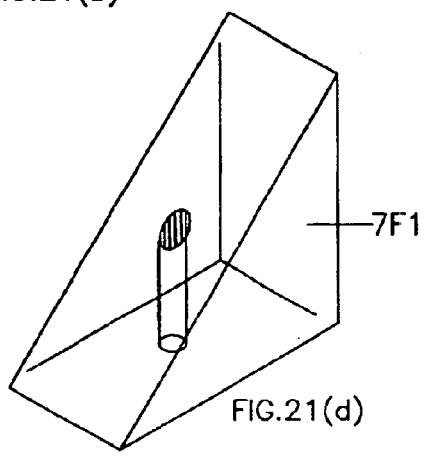
FIG.21(d)
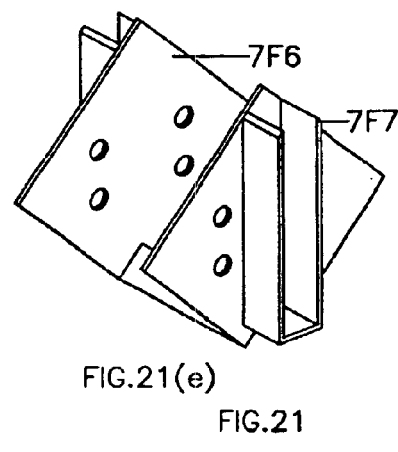
FIG.21(e)
FIG.21

EXAMPLE 1
FIG.23 ALTERNATIVES a-b

FIG.24 EXAMPLE 2

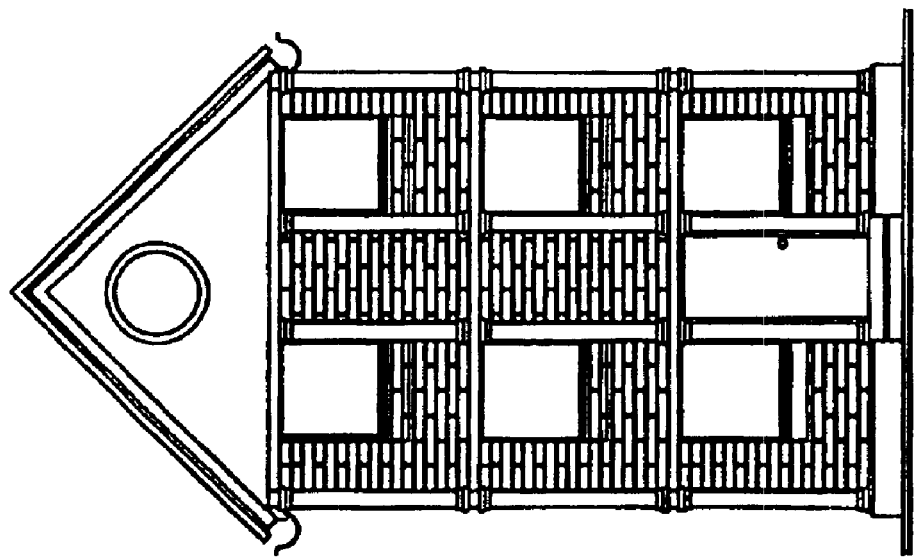
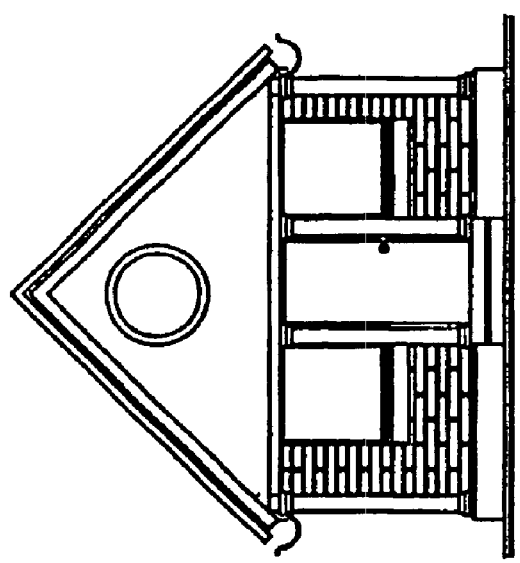
FIG. 26 EXAMPLE 4

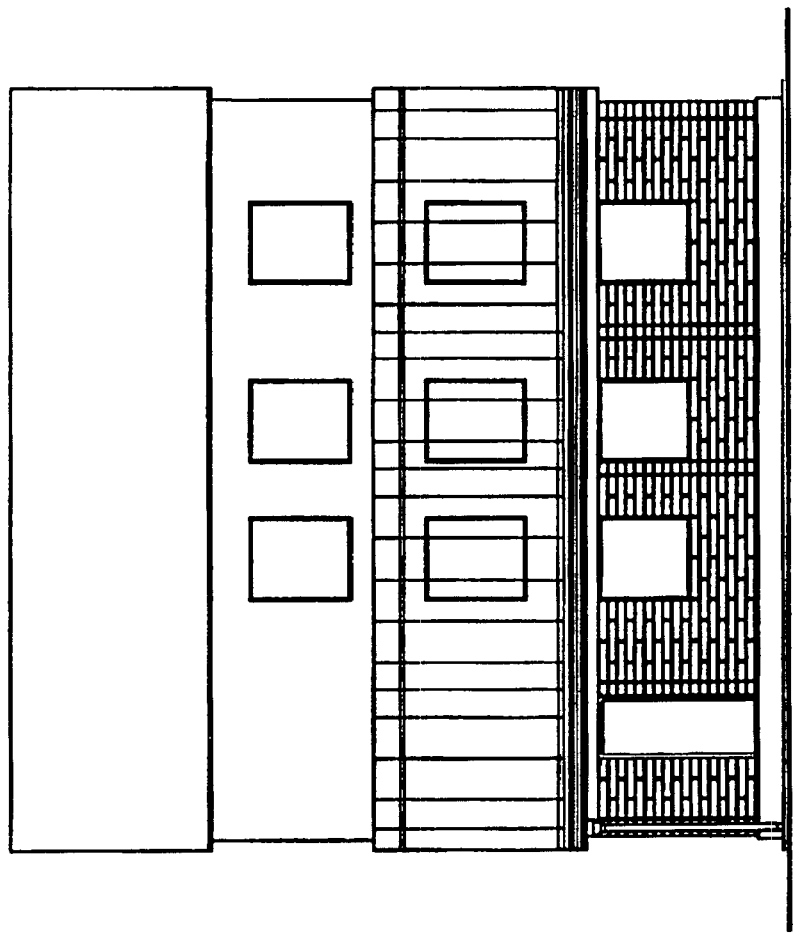
FIG. 27 EXAMPLE 5

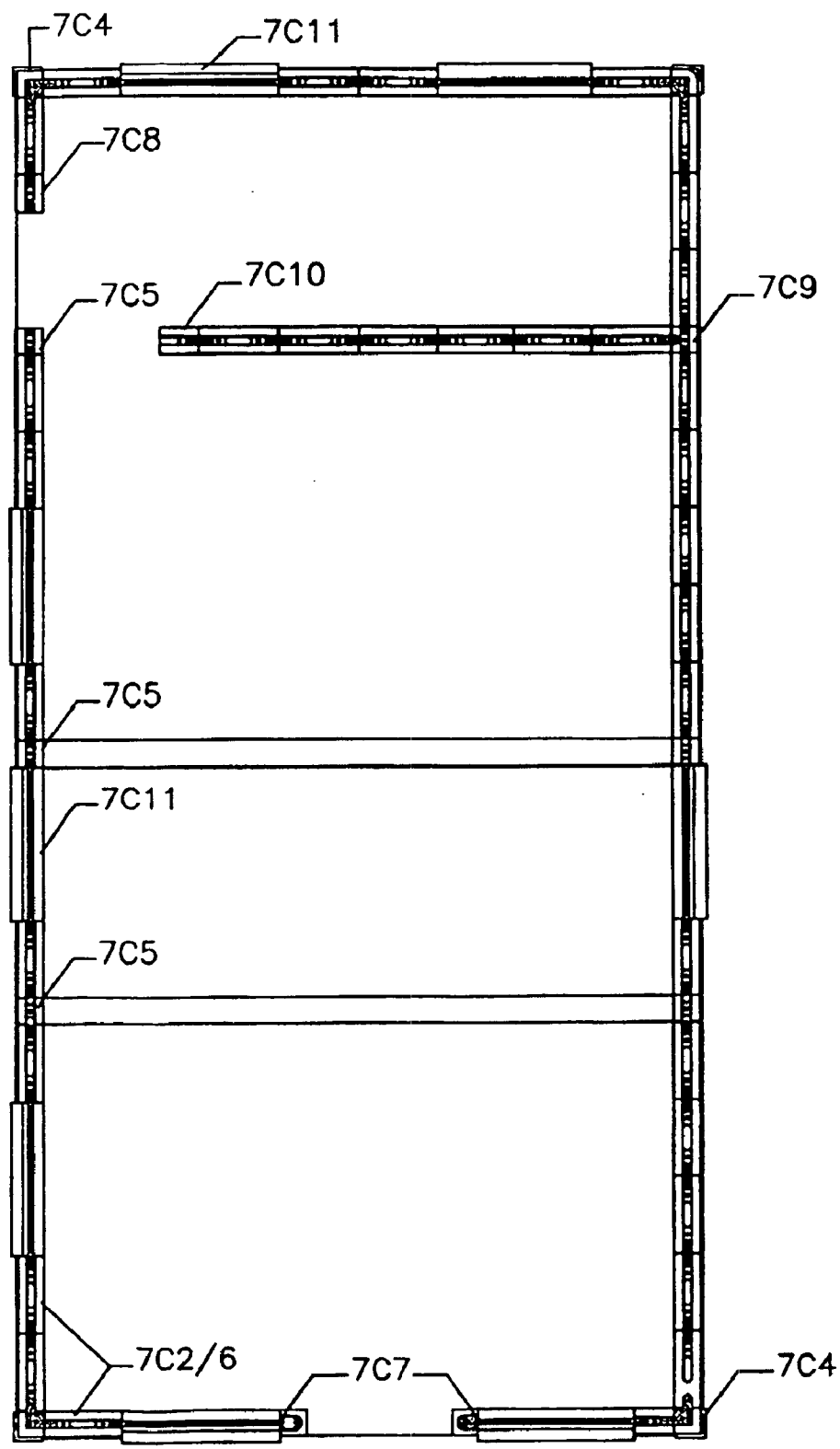
FIG.29 EXAMPLE 7

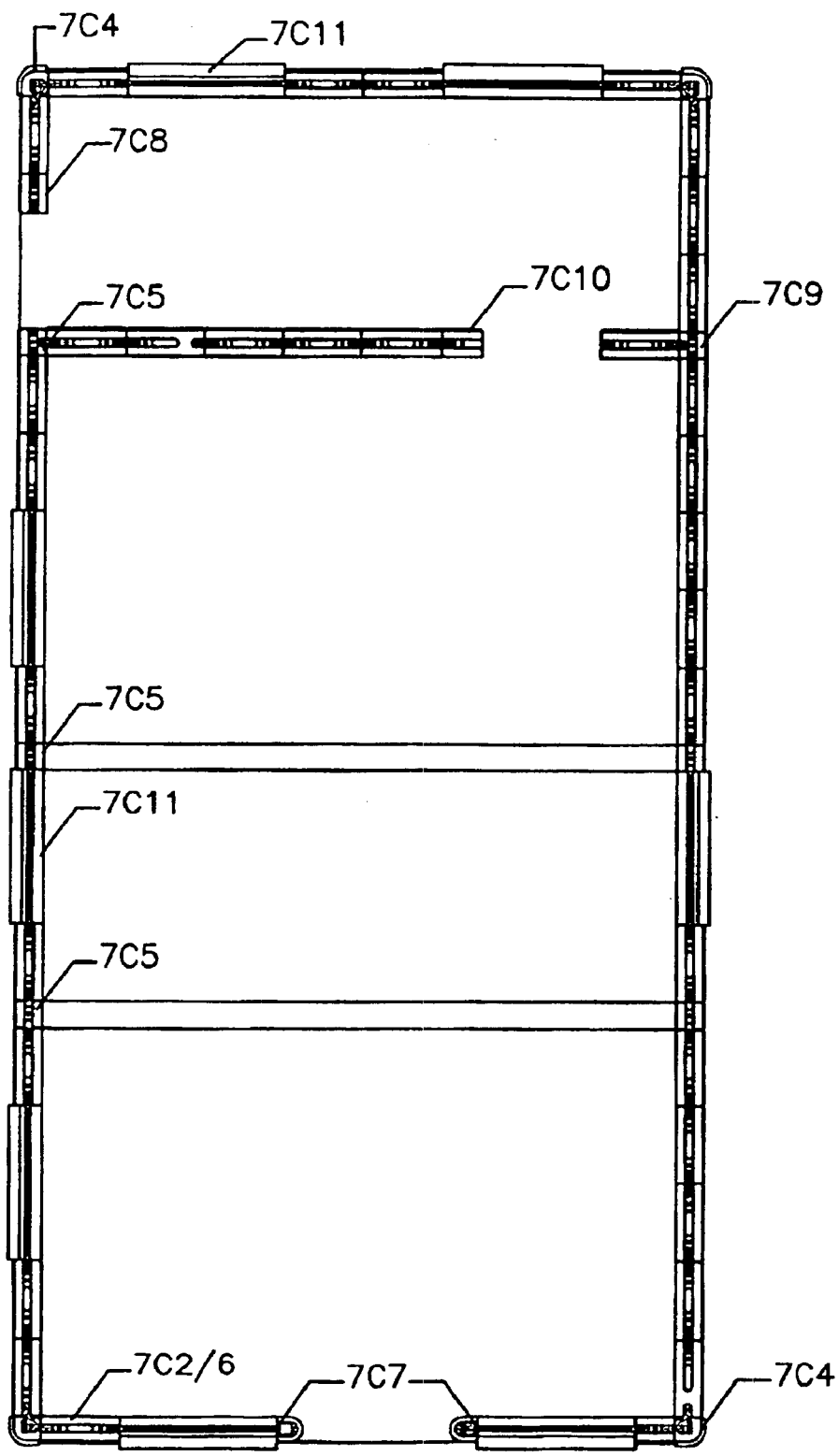
FIG.30 EXAMPLE 8

MULTIUSE CONSTRUCTION SYSTEM: MULTISPACE 2000

CROSS REFERENCE TO RELATED APPLICATION

The present application claims benefit of International Application No. PCT/CA99/00815, which was published in English and filed on Sep. 7, 1999.

1. FIELD OF THE INVENTION

This invention consists of a construction system, especially for spaces which are used as housing projects, education, small hospitals, and other uses.

2. BACKGROUND OF THE INVENTION

It is complicated and expansive to research which patents have been approved in other countries, especially in industrially developed countries such as Canada or the United States. This is why we have limited ourselves to obtaining information only about patents that either protect or benefit in some way inventions related to the construction systems field. I have, at least, been able to obtain information regarding patents published by the office of patents and brands in the United States, as well as two patents published in Ecuador, along with their drawings. Drawing U.S. Pat. No. 4,597,925 corresponds to a modular system of reinforced concrete and drawing U.S. Pat. No. 4,683,689 corresponds to the same inventor but has corrections made to the previous patent. They have also been published by the office of patents and brands of the United States.

In addition to the above, prior art U.S. Pat. No. 5,007,218 granted Apr. 16, 1991 discloses a masonry wall block system incorporating a plurality of courses of masonry block, the wall system being formed into a unitary structure through the use of post-tensioning rods tied to reinforcing rods in the wall footer and extending through voids in respective blocks to a top plate positioned on top of the wall. German Patent No. 935 328 relates to a building block which contains certain exterior grooves on one side (outside) adapted to provide cable conduits, in which cables can be embodied in mortar or the like. The other side or inner side of the block includes a tongue and groove configuration, also with cable conduit grooves, the tongue of one block interfitting with the grooves of a laterally adjacent block when a wall is constructed.

All of the building processes of these patents are not applicable to our country as most of them require a lot of very expensive technology.

It is not common for inventions to be patented in Ecuador, as the research and information are scarce. Building blocks made of ceramic brick or of concrete, prefabricated beams and platforms are used frequently. Blocks are used for walls and beams and platforms for the structure. A new variation of this block is the one made out of earthcement. Roof tiles are made out of micro-cement and are used in housing projects without following any technical building standards.

New systems are introduced either by creating agents, distribution centers, by importing them, or by assembling them in the country. These partially help out, as new prefabricated building systems are established, but unfortunately, they are pretty expensive.

3. OBJECTS AND ADVANTAGES

I will now describe the objectives and advantages of this invention, which is a construction system and is called Multispace 2000, for which we are submitting an application for a patent. The construction system can be applied to erect buildings with different uses, which is why it is called multiuse.

Objectives

The use of the space is one of the important considerations to take into account. If 52.12 square meter or 496.08 square feet are to be added to the floor plan, the basement and attic would increase in 55.12 sq.m. or 496.08 square feet. This building system, called multiuse, can be applied to housing projects, schools, business offices, tourism sites, warehouses, houses for elderly people, facilities for teenage programs, health facilities, etc. It can solve middle class low-cost housing problems, especially in countries such as Ecuador, where the deficit increases every year by around 17%. No organism, neither a governmental one, nor any other, has found a system that can be used to erect buildings in a few days, with self-management, with unskilled labourers.

Communitary action is a practice that helps to decrease the housing deficit. This system helps to decrease unemployment and to fulfil our requirements in the short term.

Natural Resources

On the roof, solar energy panels can be easily installed. They are easy to use. The solar panels can work efficiently and they fulfil the standards set by the NEC U.L. list. Automation controls can be used to increase the security of the system. Solar energy can be used to provide both electricity and for water pumps. Other energy sources are the wind and hydraulic forces. These are alternatives which have a sophisticated technology but they do not generate a lot of energy.

Solar energy systems are appropriate for small and big countries, and for country homes, tourism projects, and for rural sites, where buildings for educational purposes, health facilities, and others can be erected. These might include industrial buildings and business offices.

Countries such as Ecuador have the greatest need for energy resources that are natural and that it has in abundance. How can solar energy be used in building systems such as THE HOUSE THAT EXPANDS?

This building system uses blocks that have ducts and channels. Vertical ducts, which exist in each block, are big enough to permit airflow, either for warm or cold air to flow from the roof to the interior of the house through internal grills, that are located next to the floor for this purpose. In this way, the house's walls can be considered solar energy systems themselves. If hydraulic power exists, it is possible to use it to generate hydroelectric energy. At remote sites, solar energy can be used. Natural resources should be taken advantage of, for example solar, hydraulic, and wind energy.

Because of Ecuador's geographic location, these are the best technologies that can be developed.

Recycling

Different types of biocomponents can be used to manufacture cement blocks of different types such as:
  lightweight concrete blocks
  insulated concrete blocks
  ventilated concrete blocks.

The new technology when applied to prefabrication processes will allow us to industrialize the building process in a total and massive form, will permit us to create new systems, and to start new research in fields such as solar energy and the recycling of agricultural and natural waste materials. Some of these are quite abundant in the country, such as rice hull, coconut shells, sawdust, sugar cane bagasse, other fiber products in general. With these new building products can be created, after being mixed with chemical products such as resin. These new products can be used in this system to build blocks, floors, beams, roofs, etc. If they are preprocessed in factories they can constitute structural elements and finishing products of great quality and duration.

Enlargement Alternative

The A-shaped space can be used. This is a space that is formed between the roof and the ceiling and which can be used to increase the amount of space of the ground floor. To access it a hidden staircase or marine staircase can be used, so that there will be no interference with the rest of the circulation area. This space can be used even if the house only has a ground floor.

The surfaces that are part of the main and rear facade form a skeleton-like structure that is A-shaped. The structure can be covered with material such as wood, plywood, metallic sheets, fibro-cement sheets. A greater amount of light can enter the interior of the house. Stained glass, in the shape of a rose can be added, so that it will be more aesthetically pleasing.

So that it will look nicer, we can change the columns of the main door and corner columns, by using rectangular or round shaped blocks.

Advantages

These building systems are the main ones, and they are not known in Ecuador. These are used in the system MULTIESPACIO 2000 and when applied to housing projects they are known as: THE HOUSE THAT EXPANDS. Since around 95% of the components are prefabricated, with a simple manufacturing process, without any special machinery being required, with the labor necessary, the consumer has the following advantages (if he or she has the land and the required foundations already laid out):

immediate installation time is saved financial costs are saved amount of labor is saved the house can be put into use immediately money is saved as additional rent is not paid, etc.

These advantages are obtained whenever there are prefabricated components and they are assembled, but each system has a different range of prices. This matter is something to which a lot of thought has been given, and about which we have been careful in this invention, due to the high cost of money in this country, and to the bad financial systems that don't provide many advantages to consumers of these "product-services". Other advantages of prefabricated products are:

quality durability affordability energy efficiency protect the environment from being polluted acoustic protection reduce the amount of construction material that gets wasted long lasting.

4. BRIEF SUMMARY OF THE INVENTION

The invention in one aspect pertains to a modular building block for use in a building system, the block having top and bottom surfaces, opposed interior and exterior sides, and opposed ends, and the block having a recess extending from the top to bottom surfaces and inwardly at each end. The top and bottom surfaces are complementary in shape for interfitting, with one of the top and bottom surfaces having a ridge portion extending the length of the block and the other of the top and bottom surfaces having a groove portion complementary to the ridge portion, whereby when a plurality of the blocks are assembled horizontally and vertically with ridge portions and groove portions of vertically adjacent blocks intermitting to define a wall, the block end recesses define a plurality of vertically oriented ducts adapted to accept structural rods and mortar in selected ones of the ducts to form support columns, and to accept utility conduits in selected others of the ducts without rods and mortar. The invention is characterized wherein the ridge portion and the groove portion are centrally located on the top and bottom surfaces and the block includes a first channel and a second channel on either side of the recesses along the top and bottom surfaces which channels extend from end to end generally parallel to but laterally inwardly of the interior and exterior surfaces and laterally outwardly of the ridge portion and the groove portion. The first channel is inwardly of the exterior side of the block and the second channel is inwardly of the interior side, the first channel is smaller in cross section than the second channel and is adapted to accommodate sealing means, and the second channel, inward of the interior side, is adapted to accommodate a utility cable whereby when the blocks are assembled, the first channels of horizontally adjacent blocks define means for accommodating sealing means for sealing out weather elements, and the second channels of horizontally adjacent blocks define conduits for utility cables.

Further, the invention comprehends a modular building system for a building, including a visible foundation comprising structural beam elements of reinforced concrete having a plurality of foundation rods extending upwardly therefrom, a plurality of modular blocks for forming walls of the building extending upwardly from the foundation beam elements, the blocks having vertical apertures therethrough and adapted to be assembled into the walls such that a plurality of vertical ducts are formed in the walls by the apertures of adjacently assembled blocks. Wall rods have upper and lower ends, the lower ends of the wall rods being connectable to the foundation beam rods at selected locations thereof and adapted to extend upwardly through selected ones of the assembled wall ducts, at least some of the wall rods being of a height where the upper ends are exposed above an assembled wall. Modular floor beams are provided with means for connection of the floor beams to the visible foundation beam elements. Modular first ceiling beams are provided for extending between side walls of the building, the ceiling beams adapted for support and connection to the walls in association with the exposed upper ends of said at least some of the wall rods. A roof structure is formed of modular beams for connection with the walls in association with the exposed upper ends of at least some of the wall rods. The invention is characterized wherein, means demountably connect the roof structure to the walls whereby the roof structure is removable from an assembled building whereby the walls may be extended upwardly by additional modular blocks to form a second level, the first ceiling beams forming support for modular flooring of the second level, and the roof structure can be mounted on the extended walls, and further comprising modular wall corner blocks modular flooring windows, doors to complete and enclose the building according to a predetermined design, and further characterized wherein the modular wall blocks have top and bottom surfaces, opposed inner and outer sides and opposite ends, the top and bottom surfaces having complementary recess and protrusion configurations for interfitting vertically adjacent blocks. The modular wall blocks each have a channel in each of the top and bottom surfaces, each channel being inwardly adjacent the outer side whereby when blocks are assembled to form a wall, the channels of adjacent blocks form a conduit for containing means to seal the walls from elements of weather.

The invention further pertains to a method of constructing a building which can be expanded upwardly as, desired, the steps comprising providing a plurality of visual foundation beams to form a foundation for the building, the foundation beams including foundation rods extending upwardly therefrom at selected locations, providing a plurality of modular wall blocks for assembly on the foundation beams. In a selected configuration to form walls of the building, certain of the blocks being formed such that window and door apertures can be defined as desired, the modular wall blocks having vertically oriented apertures therethrough and assembled such as to define vertical ducts in an assembled wall, providing a plurality of wall rods and connection means for connecting the wall rods to the foundation rods, the wall rods extending upwardly through selected ones of the wall ducts, at least some of the wall rods having upper ends exposed above an assembled wall, providing ceiling beam holder boxes having means for connection with the exposed upper wall rod ends, of opposed side wells of the building, providing ceiling beams for cooperation with the ceiling beam holder boxes and means to connect the beams to the beam holder boxes, and providing a demountable roof structure for connection to assembled building walls, through connector means and the exposed upper wall rod ends, whereby the building can be upwardly expanded by removing the roof structure and extending the wall rods and walls upwardly to define a second story on which the roof is again detachably mounted.

The basic principle of prefabricated industrial systems for building has gone beyond the basic techniques of using concrete and other materials. Now recycling techniques are being used, both for structural elements as well as for completing predesigned spaces which, when combined among themselves establish a required division: production and assembly. In Ecuador, there are the traditional construction materials and very limited prefabricated production techniques, and have been in use for a few decades. Even when these are used in a massive way, in the building process, there is still a need for a lot of labor and a lot of time is required. Both of these factors, among others, have increased building costs, as well as the fact that there is a lot of waste of materials and a lack of control.

Methods for "total prefabrication" for building systems have not been researched nor undertaken here in Ecuador, yet, nor have they been patented as an invention. This is the reason why I am now requesting a patent for this novel system, which can be processed productively, and can be used as a building process with ease, and which does not require complicated machinery, nor specialized equipment nor tools, nor specialized labourers for each stage, and which will noticeably change traditional customs. This transition onto a new system should be adopted and accepted as a system of total prefabrication. The request for a patent should be considered a national priority.

Current traditional building systems cause serious economic and social problems, since each stage requires the hiring of specialized labourers. With this new system, this problem is overcome, in a large percentage, although it is necessary to create new positions for labourers in the manufacturing and in the assembly process. And, additionally, self-management is promoted as well as the use of communitary work as another possible mode of social action.

This system has been developed to fulfil basic requirements for new constructions, but the possibility has been set forth as to the addition of technological processes that will allow computer systems to be added, as well as the use of solar energy as the most valuable alternative which the country possesses, and the possibility of using recycling techniques that will employ agricultural and natural waste materials such as building waste materials, called CASCAJO. With these waste materials different types of cement-like materials can be created: hormicheaps (waste materials from sources such as wood), hormipor (waste materials obtained from fibers), hormipal (waste materials from paper sources). These will all form part of this system and with their help, the cost of producing them can be decreased.

Manufacturing and building techniques, as well as structural and cost calculations, have been taken into consideration while developing this system. This system can be used to build different types of constructions such as housing projects tourism buildings, buildings used to educate people, for recreational purposes, etc. Because of this reason, the system will be called MULTISPACE 2000 (MULTIESPACIO 2000), and when applied to housing projects: THE HOUSE THAT EXPANDS.

The new technology when applied to prefabrication processes will allow us to industrialize the building process in a total and massive form, will permit us to create new systems, and to start new research in fields such as solar energy and the recycling of agricultural and natural waste materials. Some of these are quite abundant in the country, such as rice hull, coconut shells, sawdust, sugar cane bagasse, other fiber products in general. With these new building products can be created, after being mixed with chemical products such as resin.

These new products can be used in this system to build blocks, floors, beams, roofs, etc. If they are preprocessed in factories they can constitute structural elements and finishing products of great quality and duration.

This system uses prefabricated, modular, and industrialized components. This system consists of interlocking blocks and prefabricated modular wall components, which are made out of lightened concrete. The concrete is obtained by a process of creating molds, vibrating the mortar mix, pressing the mix, and pouring it. Low-cost recycled products are used, as well as construction material waste products. This mix is then poured into vertical ducts to form walls and columns on top of the foundation beam. On top of all of this, there is a top beam which is constructed on top of the walls, that are the central and lower part of the system.

In the upper and lower sides of the block, there are channels, of small diameter on their outer sides, and larger diameter on the inner sides. These channels traverse the whole length of the lower and upper sides of the block. The outer side is used to install a rubber gasket on the outer visible side. This rubber gasket does not allow humidity, wind, and water to seep in between the blocks.

On the inner side water pipes, electric cables, phone cables, audio cables, etc., can be installed after the blocks have been laid out, before any mortar is added. This allows the easy installation of all these cables without it being necessary to install them separately. In this manner less cable is used, the walls are not broken, it is not necessary to spend time repairing walls, and less time and labor are spent.

In the bottom side of the building block, there are vertical ducts which are used for installations of 1 inch in diameter. There are vertical ducts in the center of the block and half-ducts at both extremes through which rods can be placed. These rods will form part of the walls' structures. Through these ducts lightened mortar can be poured which will constitute small columns of reinforced concrete, located every 60 centimeters. There will also be empty vertical ducts for sanitary and other types of installations, also every 60 centimeters. Both columns and empty ducts can alternate each other.

The columns at the corners and intermediate wall columns are constituted by building blocks with different designs through which structural iron rods will be placed. The half-ducts of the column blocks are thus complimented by the other half-duct blocks which are part of the wall, so that they can be used when pouring the mortar and as part of the structure of the columns. All of this will form part of the general structure of the self-supporting system.

The half-ducts of the extremes of the wall and column blocks can also be used to support, internally, the window-frame and door-frame structures. Once the mortar is placed on these structures they will be able to support them securely, with corresponding wall openings or empty spaces left for doors and windows.

The center empty ducts of the wall blocks can be used, every few centimeters, for the flow of warm air, of cold air, of electricity, refrigeration, etc., and these systems can be activated by solar energy (optional). The solar energy system can be placed on the roof of the house. Pipes for the sanitary water system can use the ducts of wall blocks.

What has been described is the main part in section 6.2 herein. The lower part corresponding to the foundation system is described in section 6.1 herein and the upper part, or roofing system, in section 6.3 herein.

The "dismountable roof" will allow builders to repeat the same process to expand onto the next floors, which is why this is the only HOUSE WHICH EXPANDS, or the only MULTISYSTEM with MULTIPLE USES, which can be applied to any type of space, up to three levels above the ground floor level, that is +−0.00 meters.

Horizontal channels can be used for several different purposes: TV and audio equipment cables, electricity, communication and other types of cables. If the empty ducts are not used for solar energy components, if for example, conventional electrical energy will be used, several block ducts or channels can be used for water pipes or other type of sanitary installations.

When the building is being erected, all of the vertical ducts and empty spaces will be aligned with each other, all the way up to the roof beams.

This idea of a "smart wall" is sophisticated, and this can be done, due to the different shapes that the blocks have.

5. BRIEF DESCRIPTION OF THE DRAWINGS

FIG. 1 is a perspective view of part of the foundation.

FIG. 2. comprises a sectional view 2(a) of part of the foundation and wall construction with enlarged views 2(b), 2(c) and 2(d) of certain of the components shown in view 2(a).

FIG. 3 comprises a perspective view 3(a) and top view 3(b) of part of the general modular wall construction.

FIG. 4 comprises a perspective view 4(a) and top view 4(b) of part of the modular wall construction adjacent a modular window.

FIG. 5. is an exploded perspective view of part of the foundation to which a beam and column support are associated to support modular wall blocks.

FIG. 6 comprises a perspective view 6(a) of a foundation fastening beam and enlarged views FIG. 6(b) and 6(c) of rubber bearings.

Figure 1:
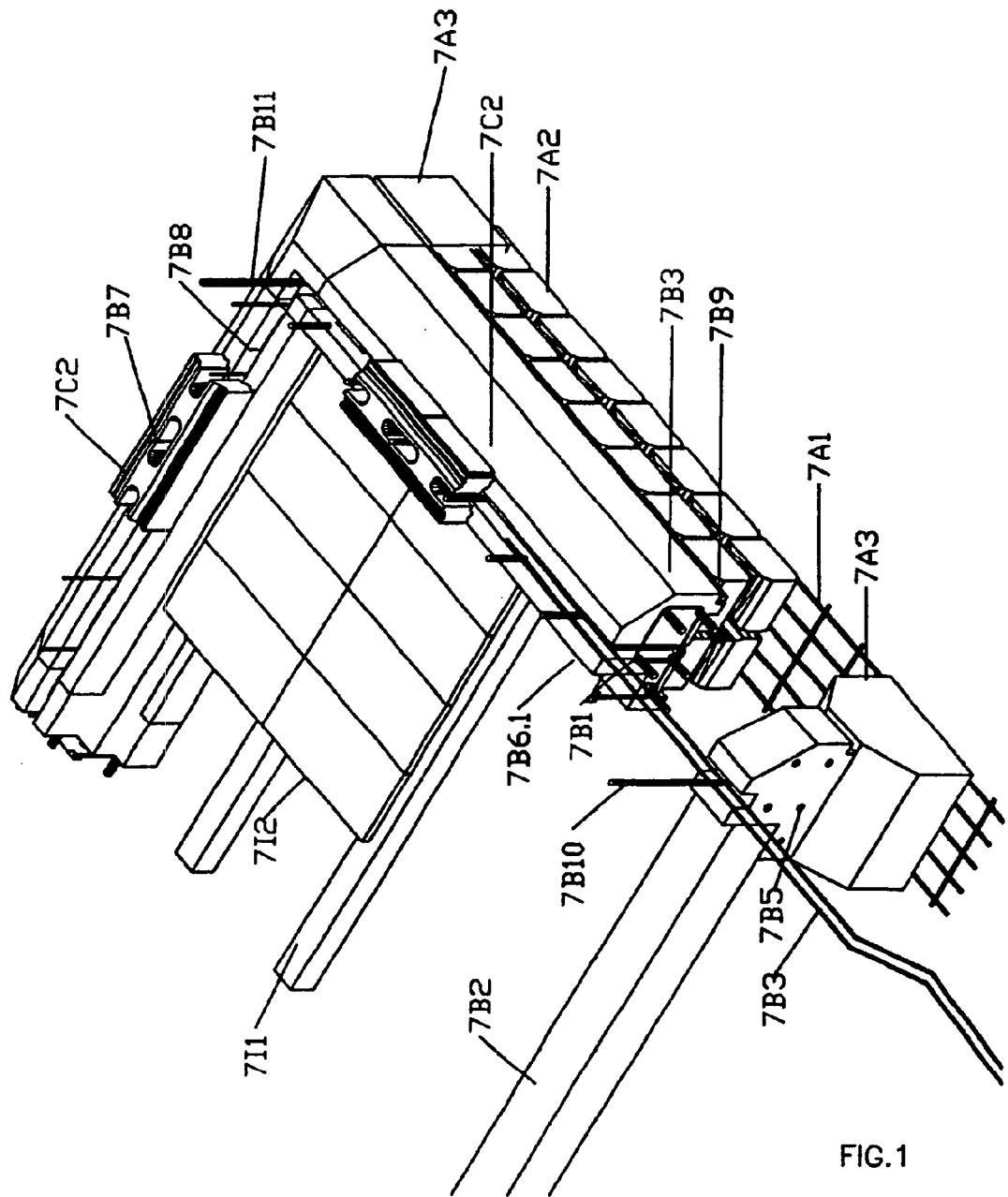
Figure 2:
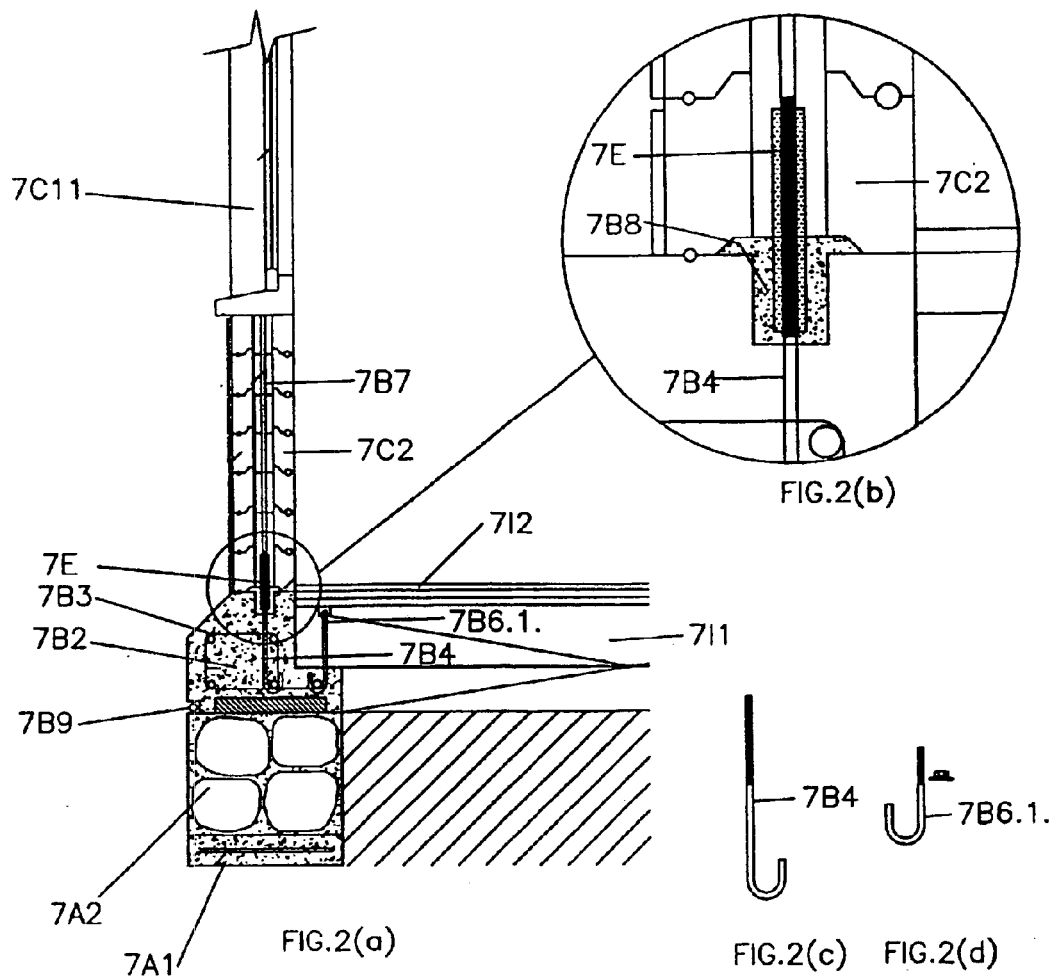
Figure 5:
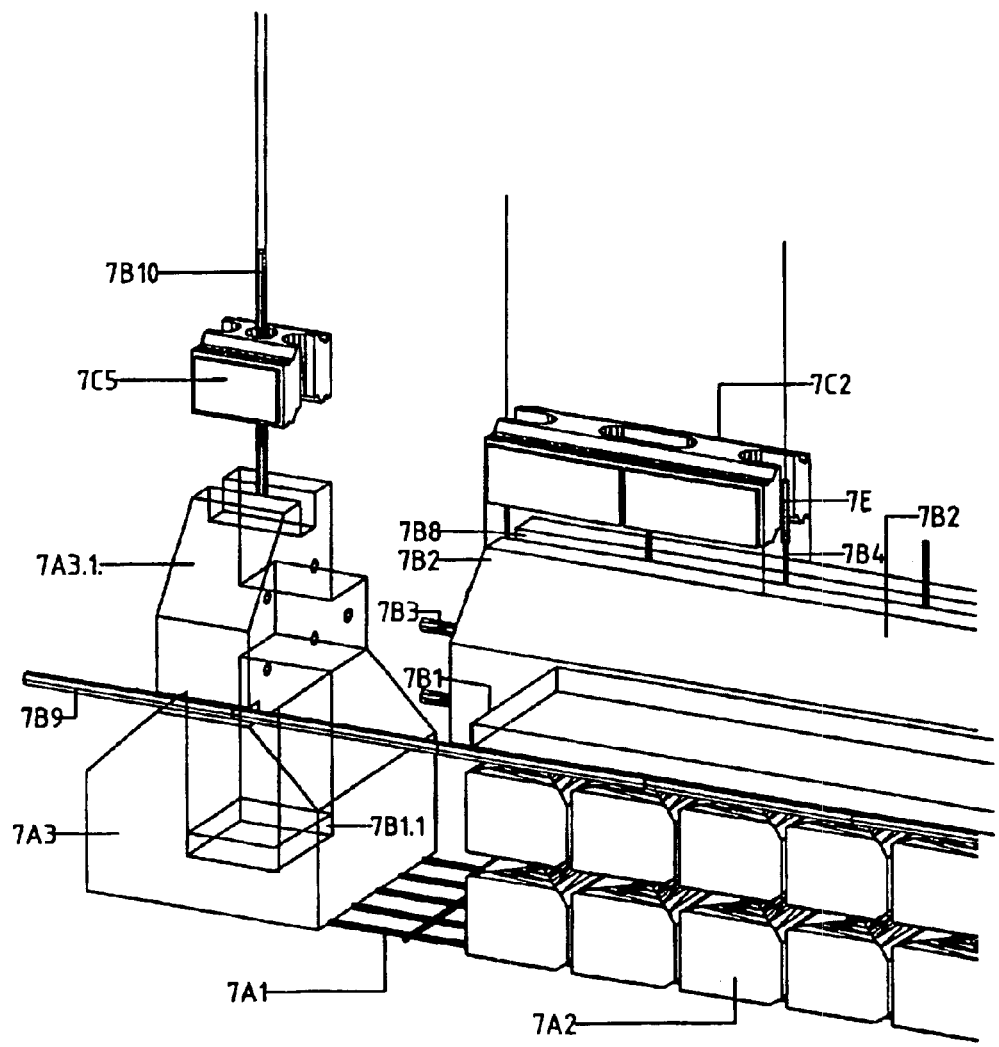
Figure 7:
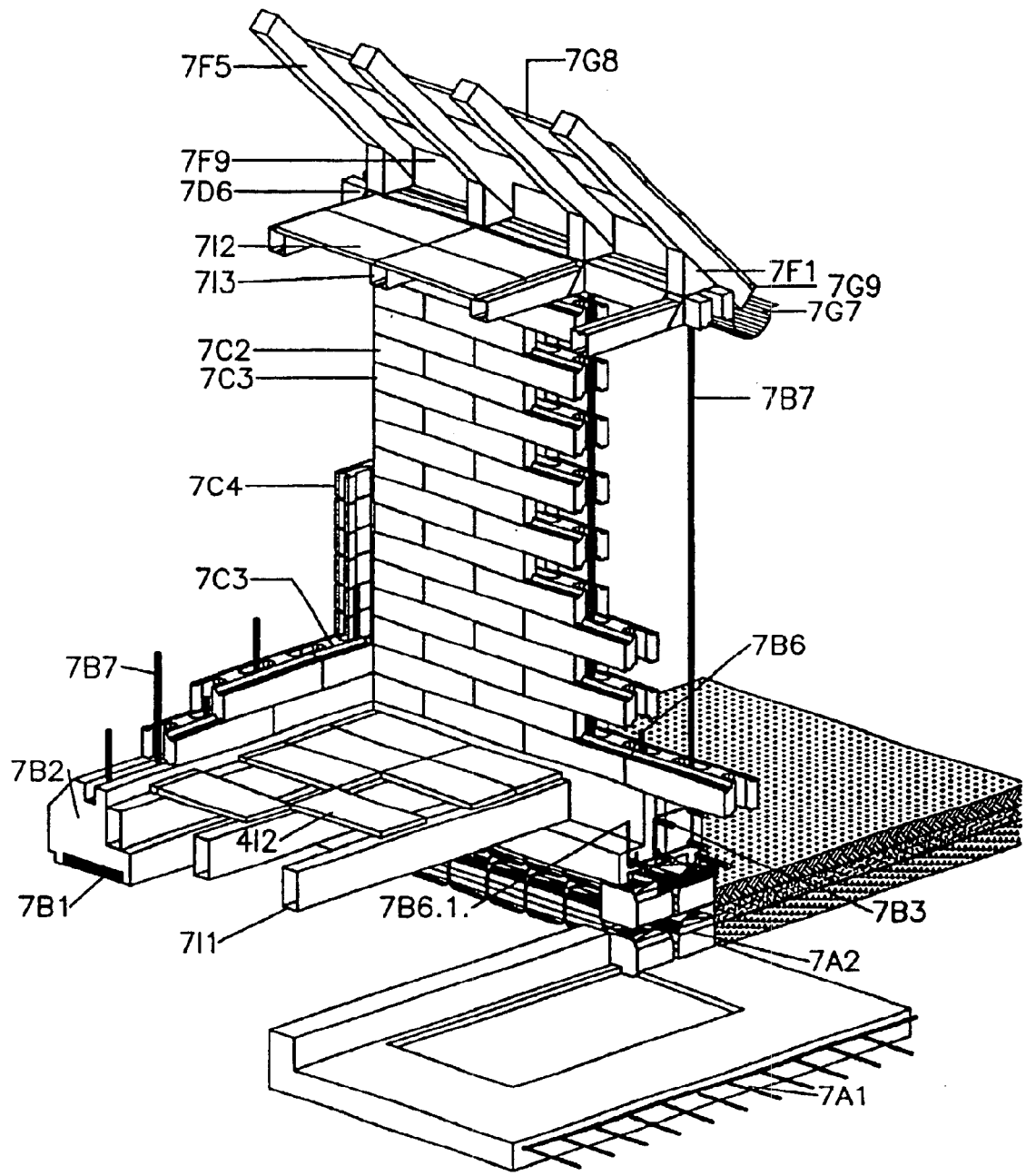
FIG. 7 is a perspective view of part of a floor, wall and roof modular construction.
Figure 8:
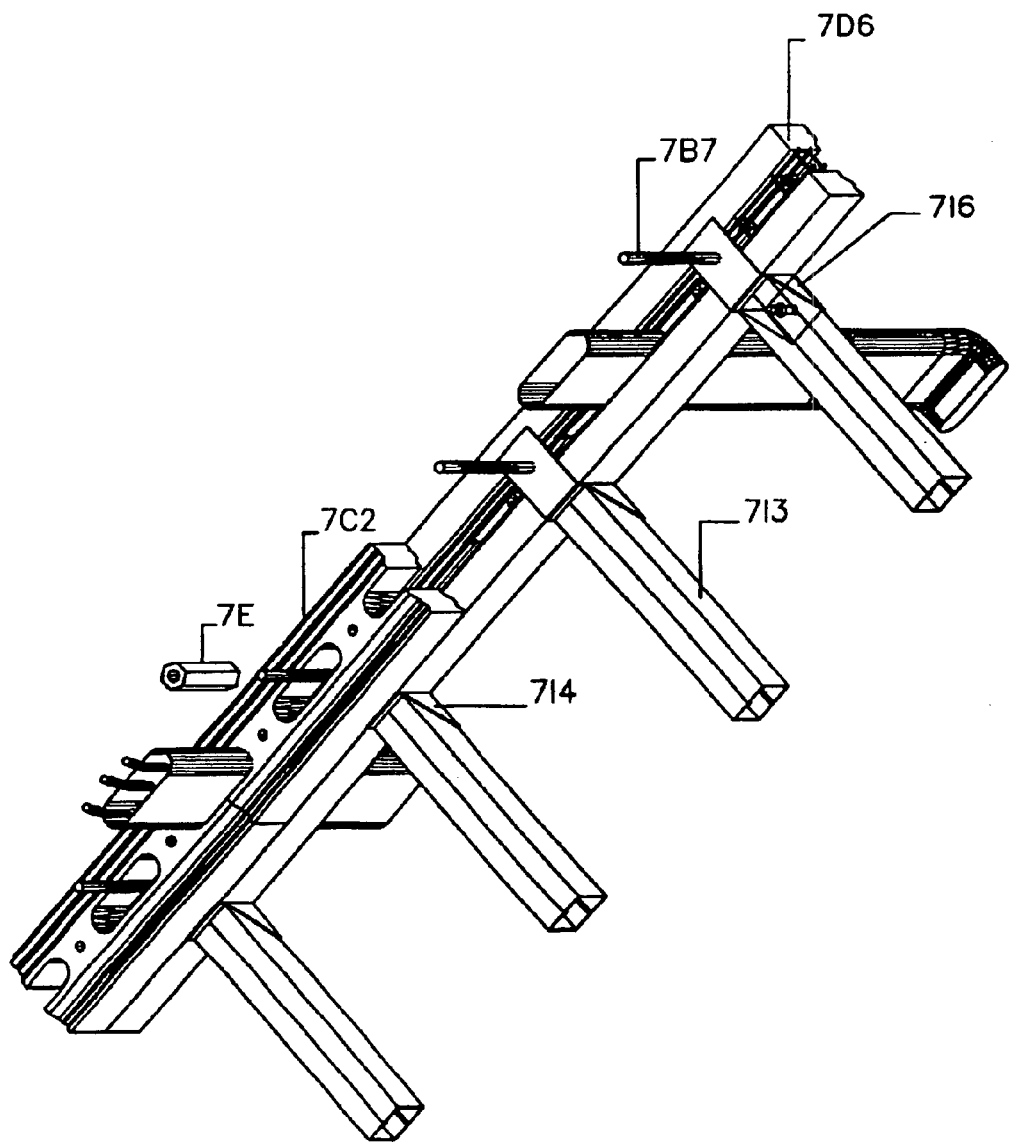
FIG. 8 is a perspective view of the attachment of floor/ceiling beams to lateral walls and showing duct work.
Figure 9A:
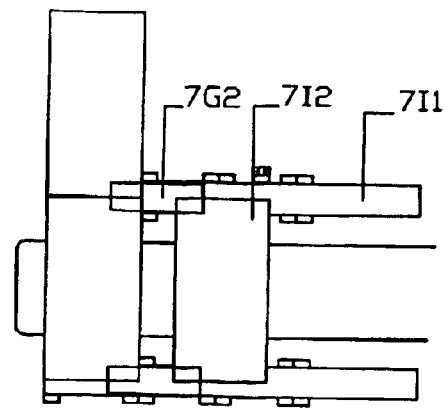
Figure 9B:
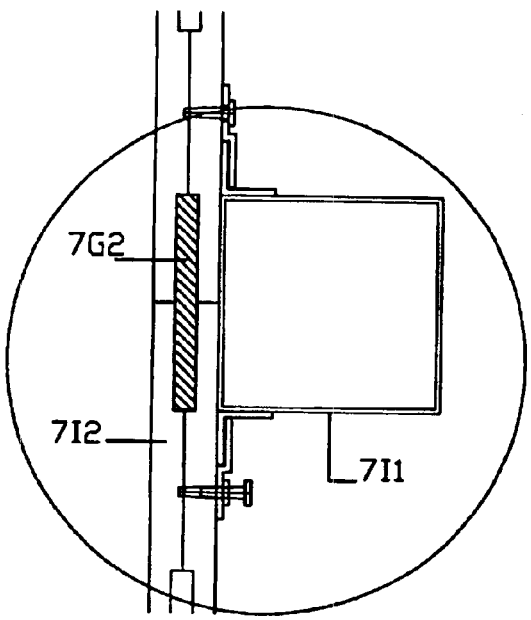
Figures 9, 9C, 9D:
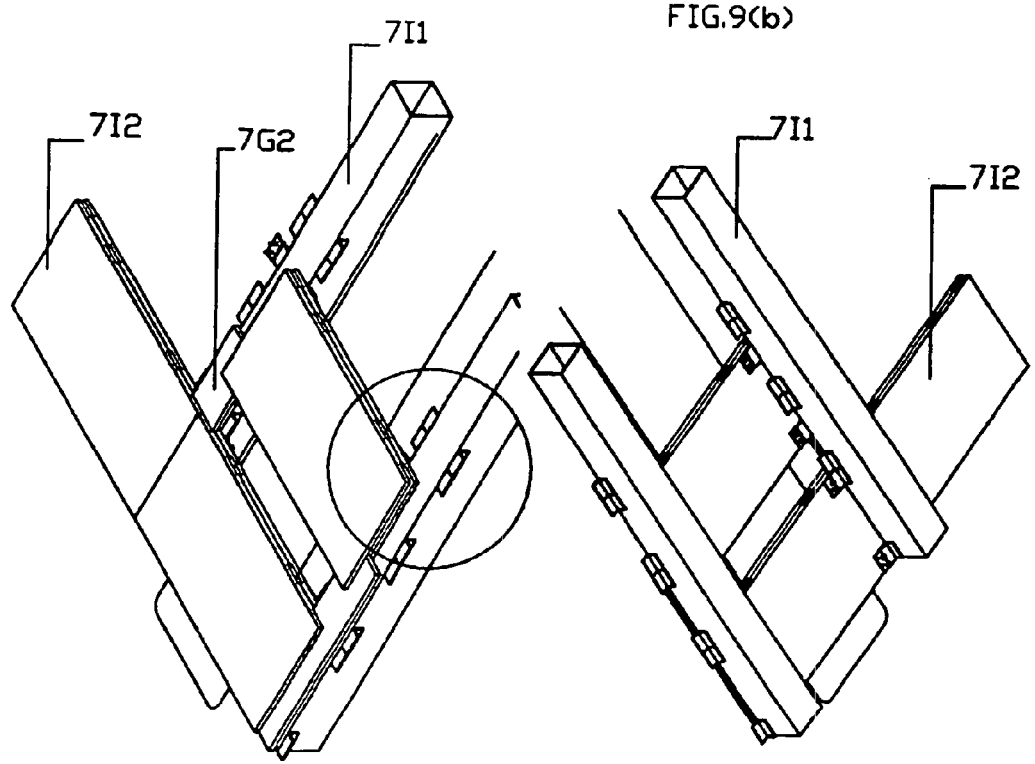

FIG. 9 comprises a series of views illustrating the securement of floor modules to floor beams, with FIG. 9(a) being a top view, FIG. 9(b) being an enlarged side section view, FIG. 9(c) being a top perspective view and FIG. 9(d) being a bottom perspective view of the view of FIG. 9(a).

Figure 10:
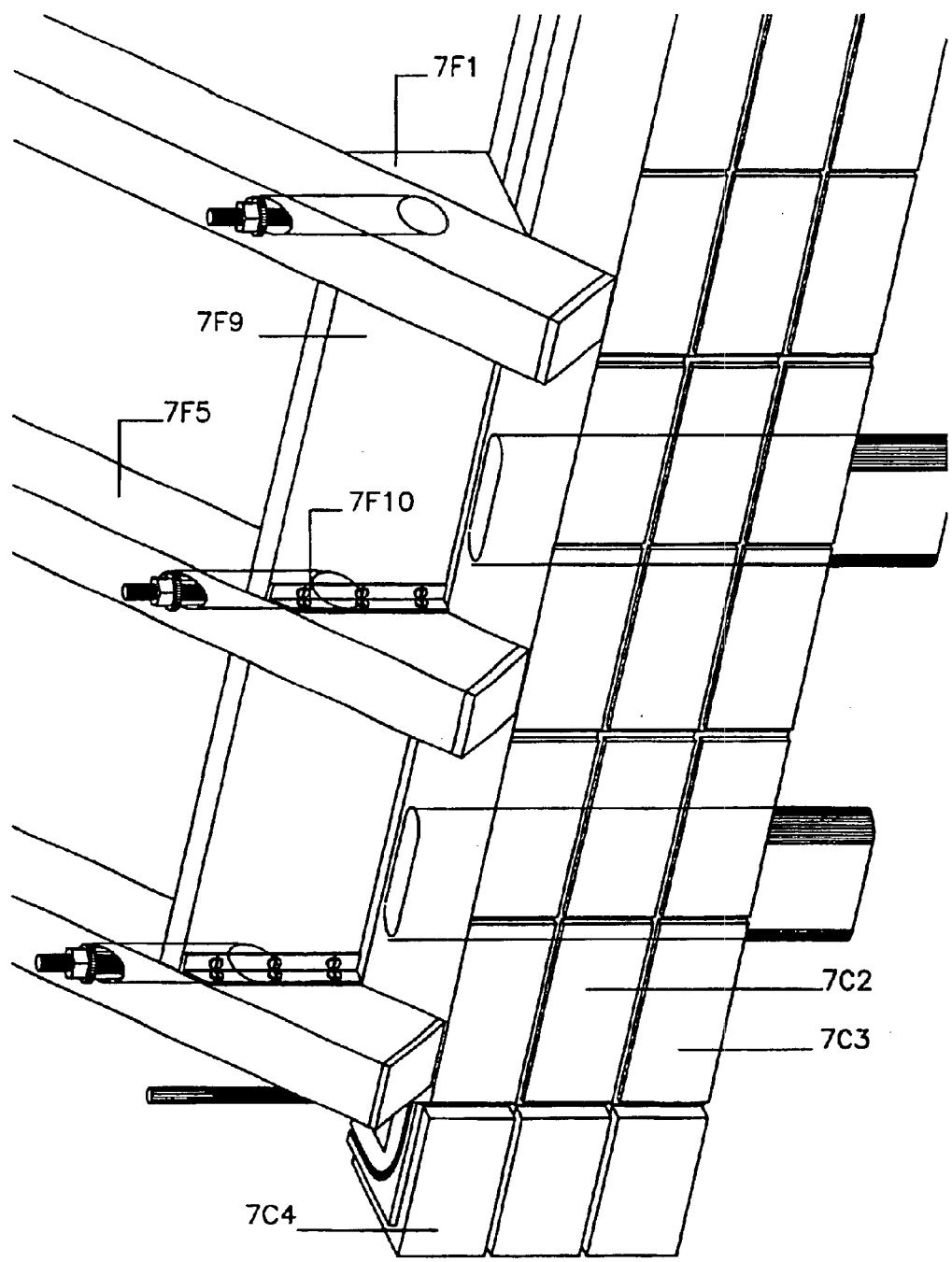

FIG. 10 is a perspective view of the securement of the spacer cover with the roof beams and beam support above a wall.

FIG. 11 comprises a perspective view FIG. 11(a) of a door associated with part of a wall made of basic blocks with an enlarged view FIG. 11(b) of the junction of wall and door frame.

Figure 12:
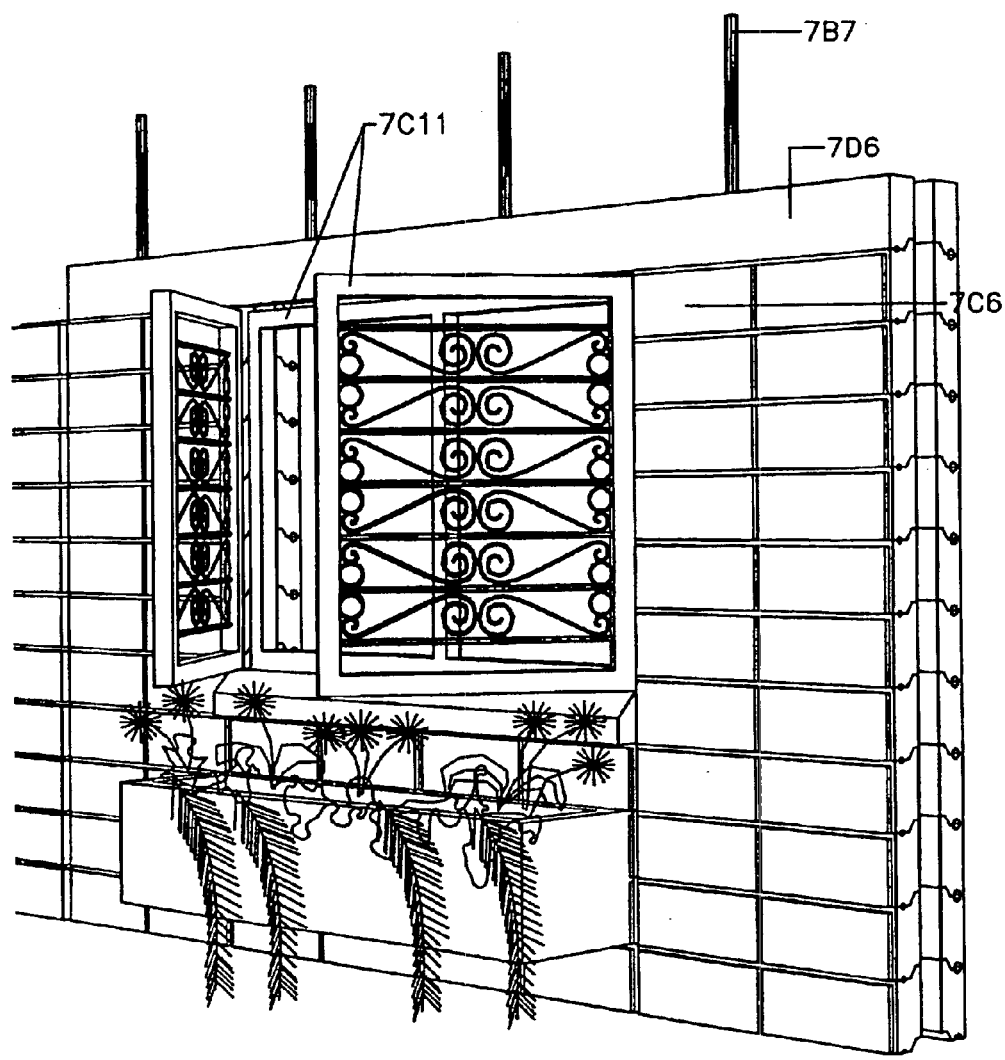

FIG. 12 is a perspective view of a window unit associated with part of a wall made of basic blocks.

Figure 13C:
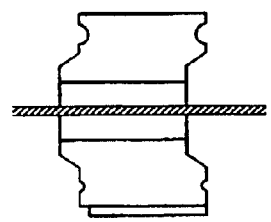
Figures 13D, 13E:
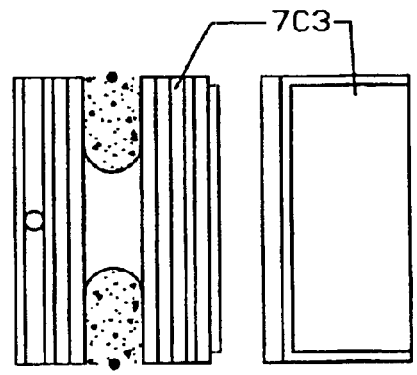
Figures 13A, 13B:
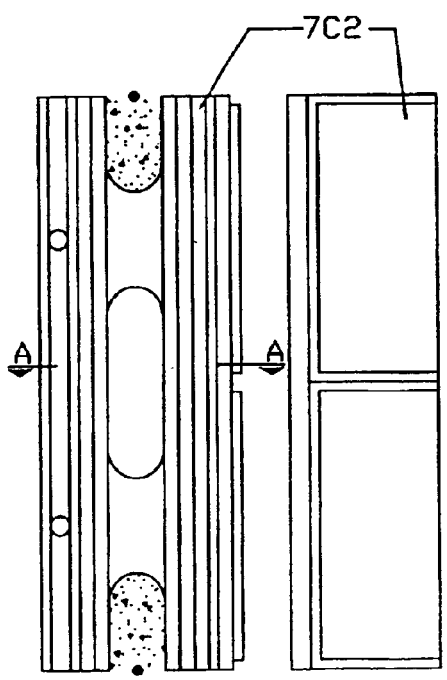
Figures 13F, 13G:
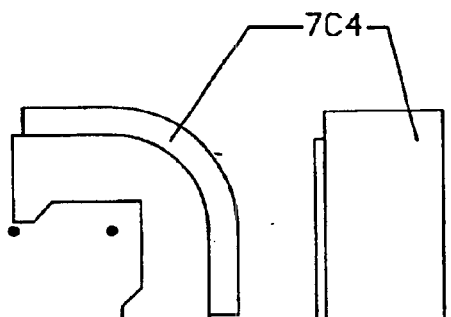
Figures 13H, 13I:
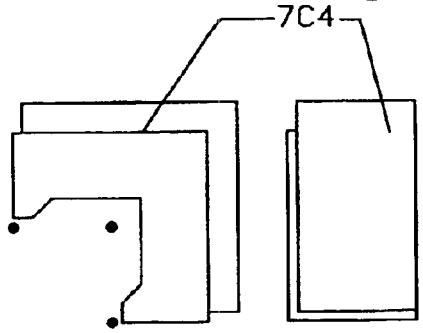

FIG. 13 comprises a series of views of the basic block in top view FIG. 13(a); side view FIG. 13(b); and sectional view 13(c) with wall rod therethrough; half block in top view FIG. 13(d) and in side view FIG. 13(e); rounded corner blocks in top view FIG. 13(f) and in side view FIG. 13(g); and rectangular corner blocks in top view FIG. 13(h) and side view FIG. 13(i).

FIG. 14 comprises a series of views of various blocks, including a half block and one for adjacent windows and doors in top view FIG. 14(a) and side view FIG. 14(b); a block for fastening walls and interior walls in top view FIG. 14(c) and side view FIG. 14(d); a block for use in intermediate fastening columns in top view FIG. 14(e) and side view FIG. 14(f); and various views of main door blocks, namely, rectangular main door blocks in top view FIG. 14(g) and side view 14(h) of rounded main door blocks in top view FIG. 14(i) and side view 14(j), an alternative main door block in top view FIG. 14(k) and side view 14(l), FIG. 15 comprises a series of views of the basic module wall block, in top view FIG. 15(a), side view FIG. 15(b), end view FIG. 15(c) and front perspective view FIG. 15(d).

FIG. 16 is a further front perspective view FIG. 16(a) and opposite end views FIG. 16(b) and 16(c) of the basic module wall block.

Figure 17:
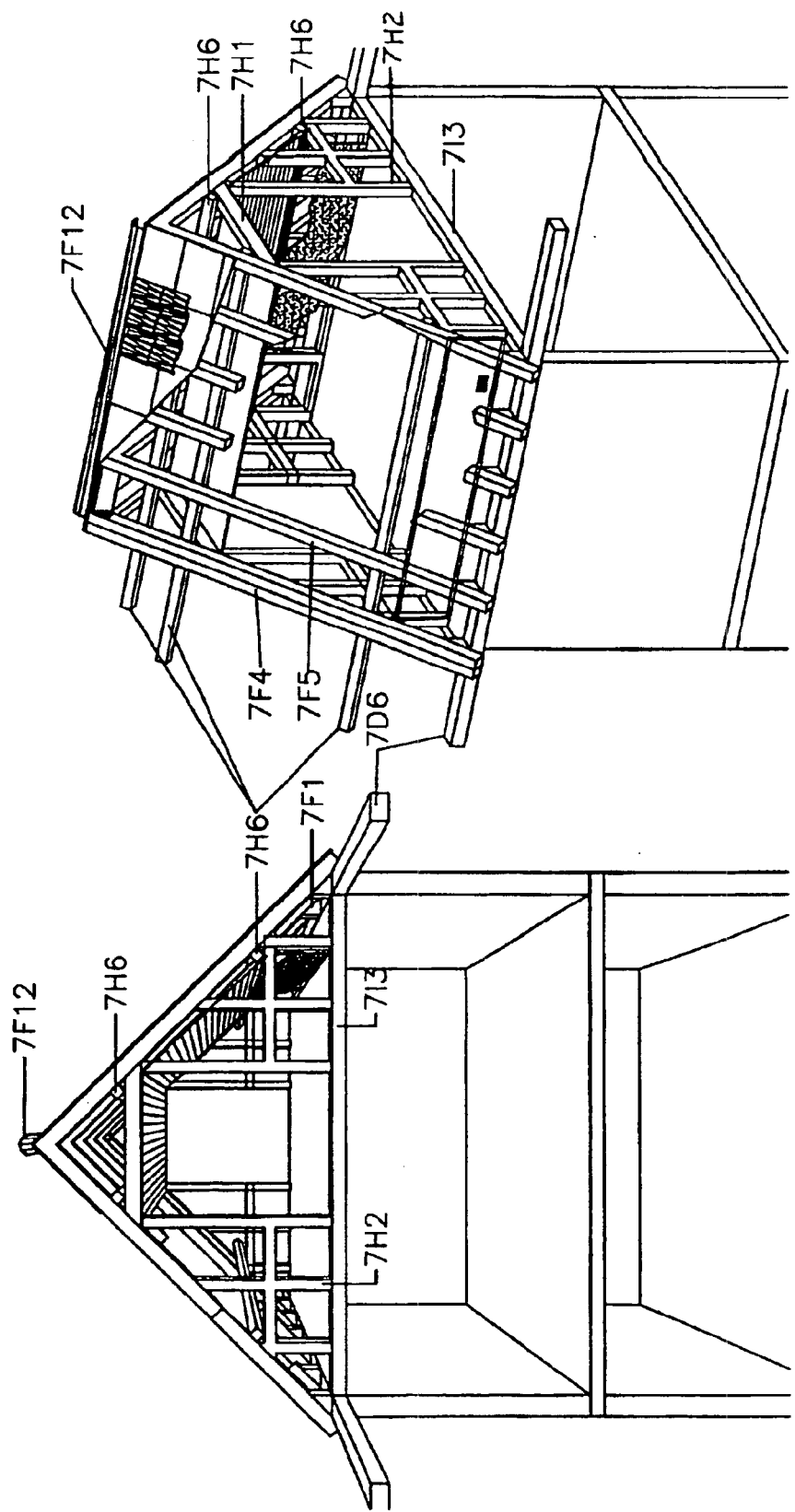

FIG. 17 comprises two views of part of the roof construction of the housing unit, FIG. 17(a) being a front perspective view and FIG. 17(b) being a left side perspective view.

Figure 18C:
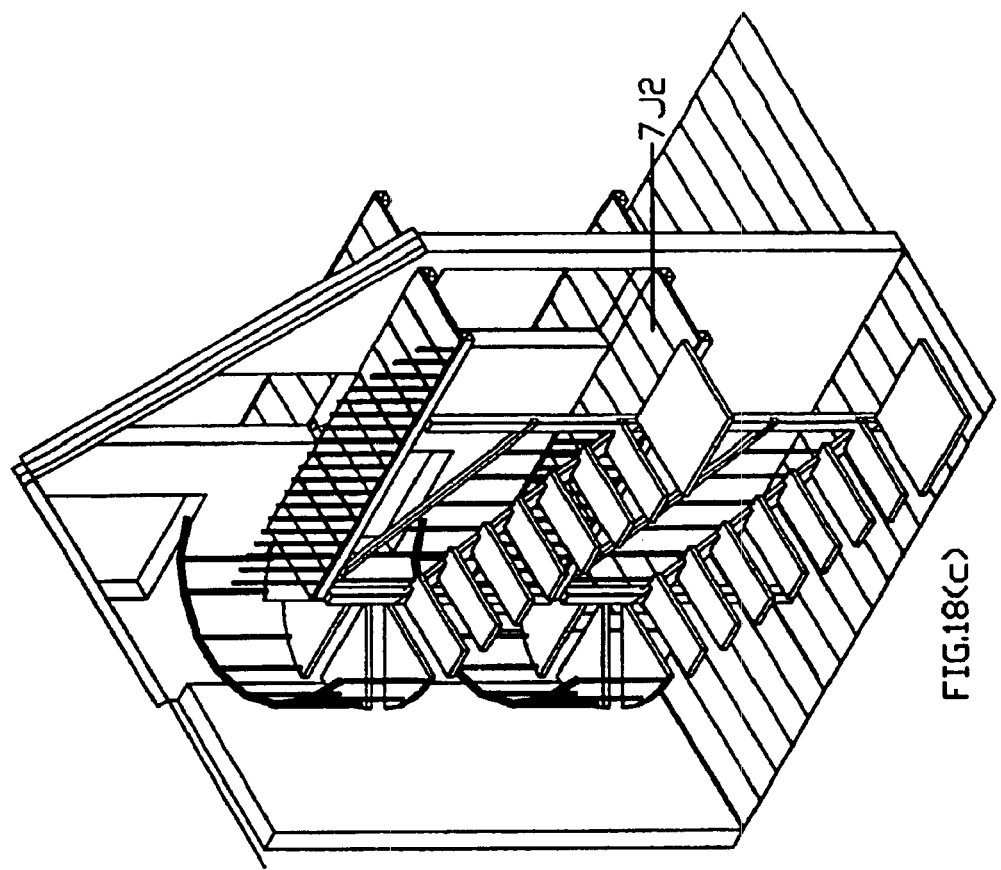
Figure 18A:
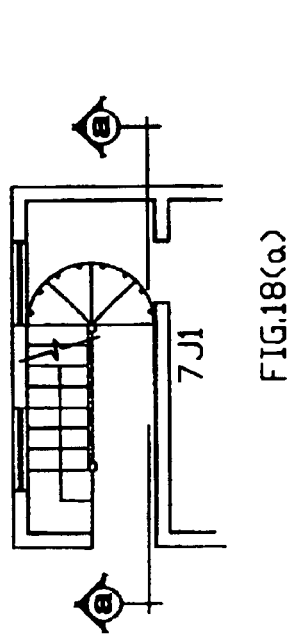
Figure 18B:
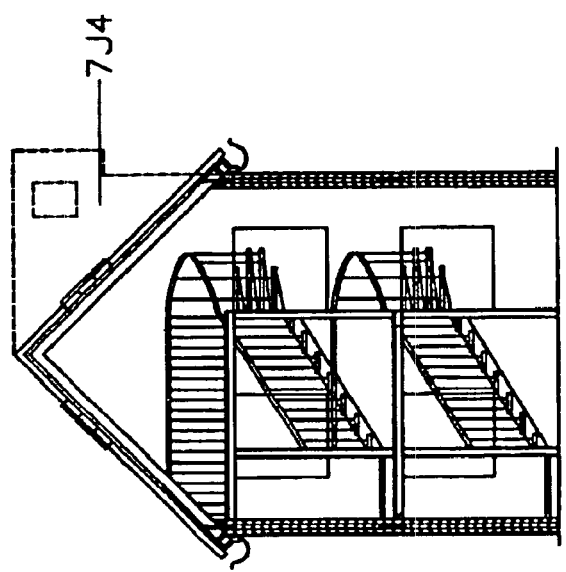

FIG. 18 comprises a top view FIG. 18(a) of a stair case and landing with FIG. 18(b) being a sectional view thereof as related to a two story housing unit and also showing a roof expansion, and a perspective view FIG. 18(c) thereof.

Figure 19:
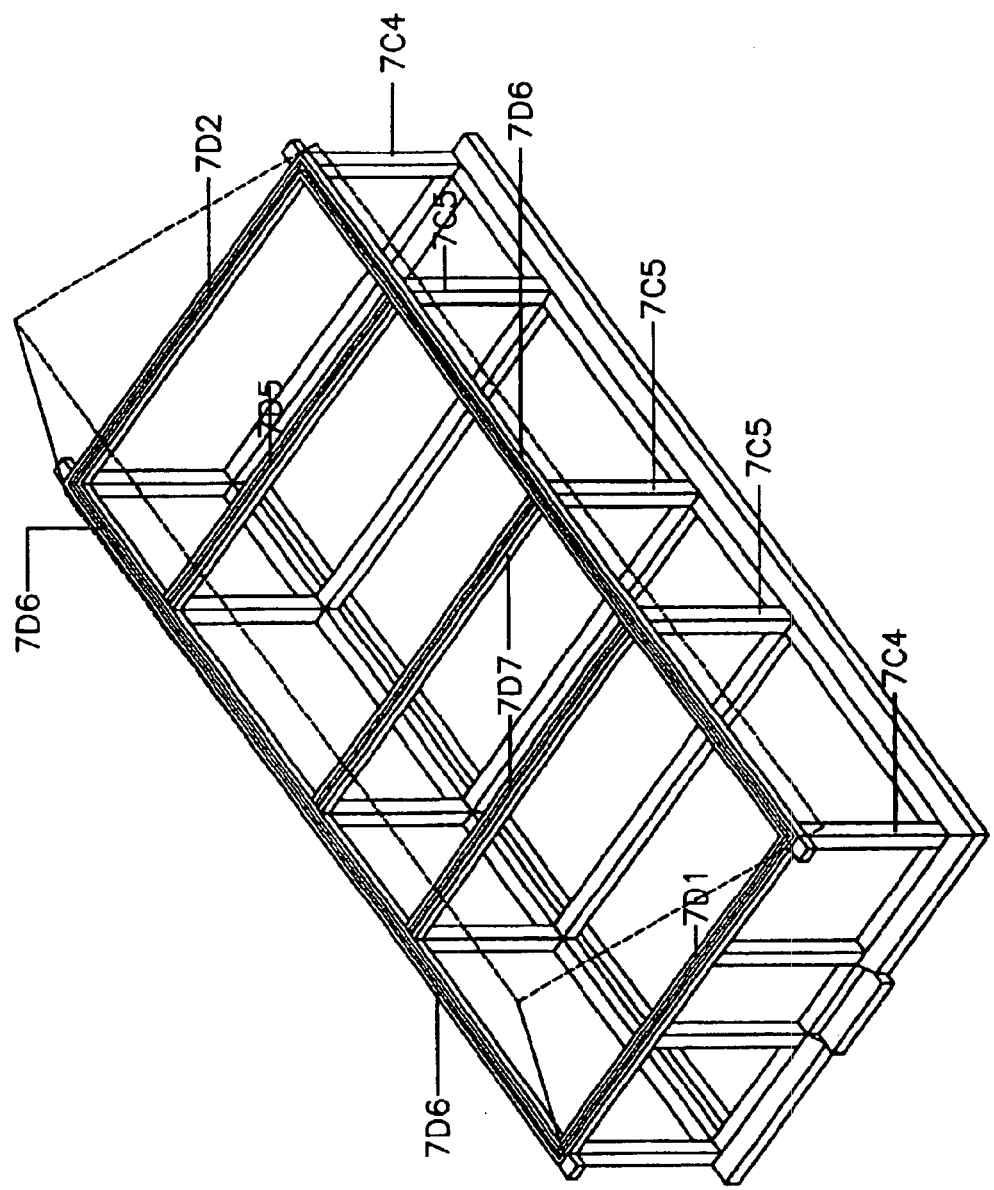

FIG. 19 is a perspective view showing the corner and intermediate column structure, and beams for intermediate wall structure.

Figure 20:
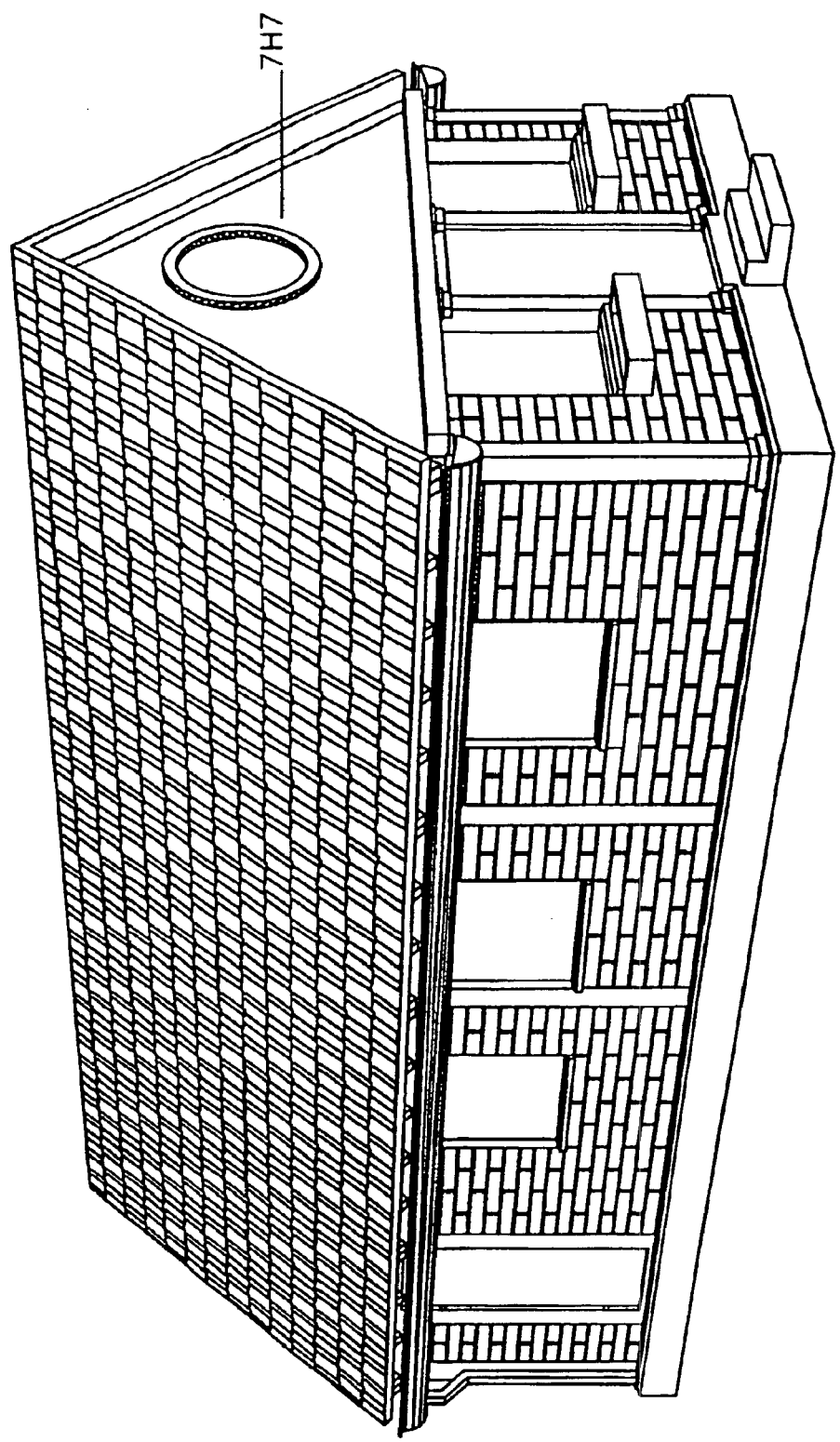

FIG. 20 is a perspective view of the outside of a completed building unit including the front facade.

FIG. 21 comprises a series of views illustrating connections and elements of connection between the walls, beams and roof; namely, FIG. 21(a) of walls and ceiling beams; FIG. 21(b) of the walls and roof support; FIG. 21(c) of the roof beams and ridge cap; and a perspective view FIG. 21(d) of a beam support, and a perspective view FIG. 21(e) of a beam connection for single and double beams.

Figure 22:
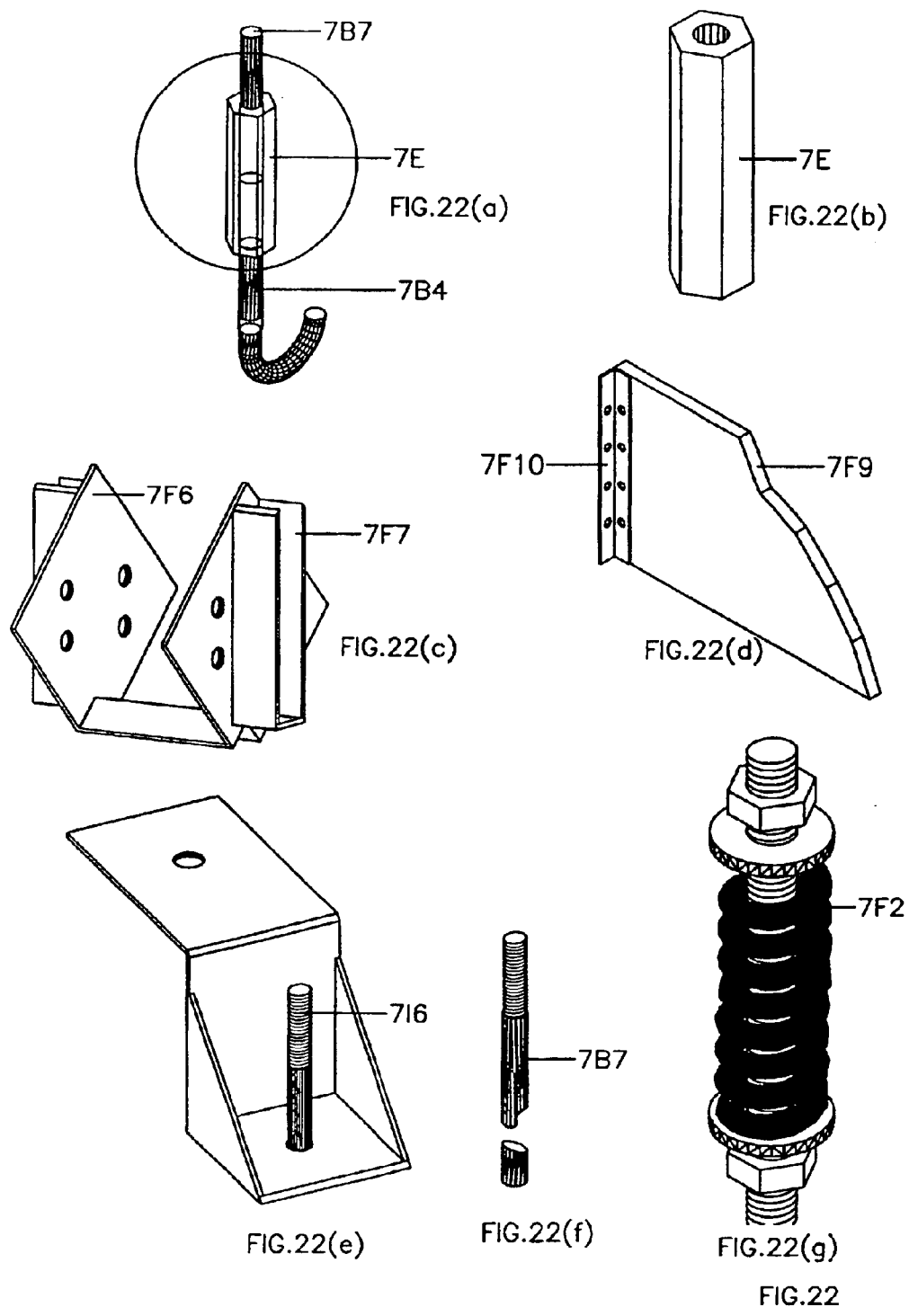

FIG. 22 comprises a series of views of various connector elements, namely perspective views FIG. 22(a) and (b) of connectors for rods of the basic wall blocks; a perspective view FIG. 22(c) of a double or single beam connector; a perspective view FIG. 22(d) of a space cover angle; a perspective view FIG. 22(e) of a beam holder box; a perspective view FIG. 22(f) of the end of a wall rod; and a perspective view FIG. 22(g) of a spiral connector.

Figure 23:
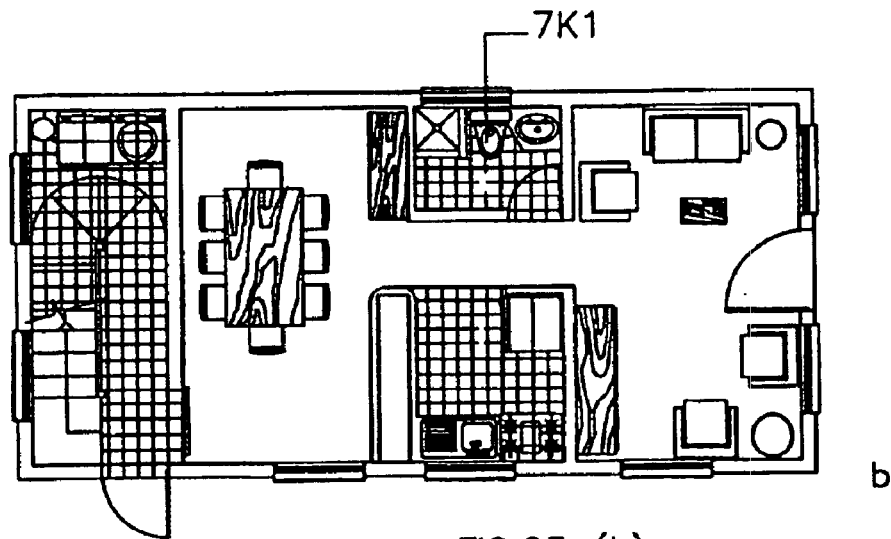
Figure 23:
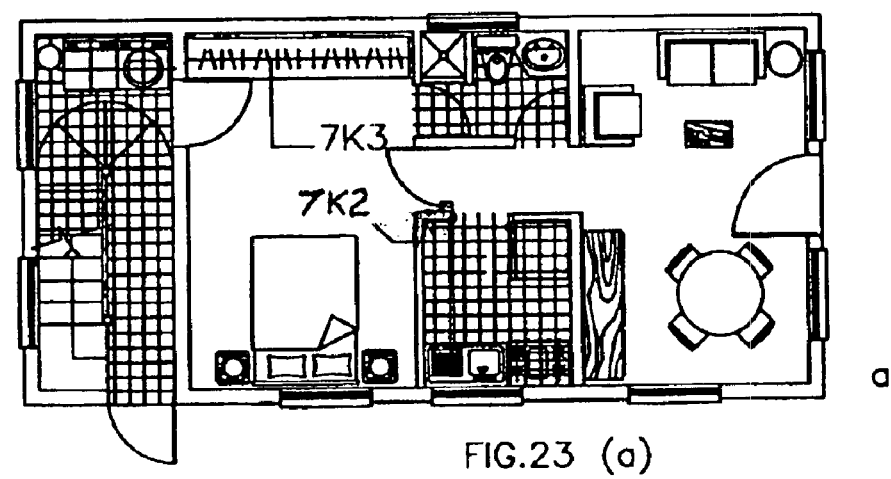

FIG. 23 comprises top views FIG. 23(a) and FIG. 23(b) of two alternative layouts for walls and furniture.

Figure 24:
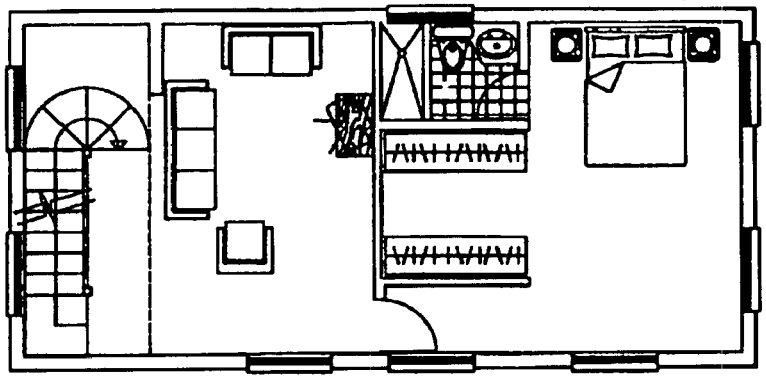
Figure 24:
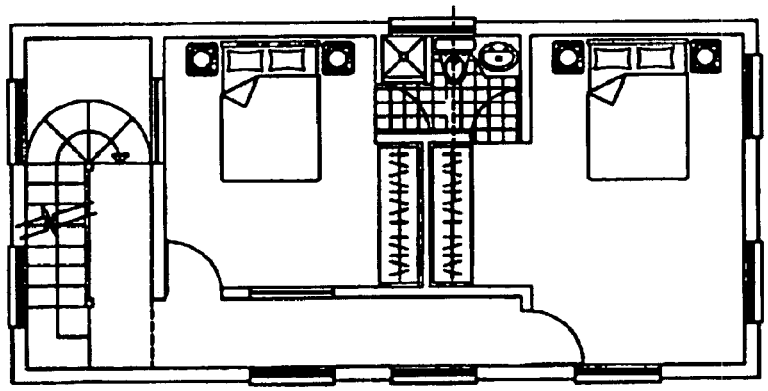
Figure 24:
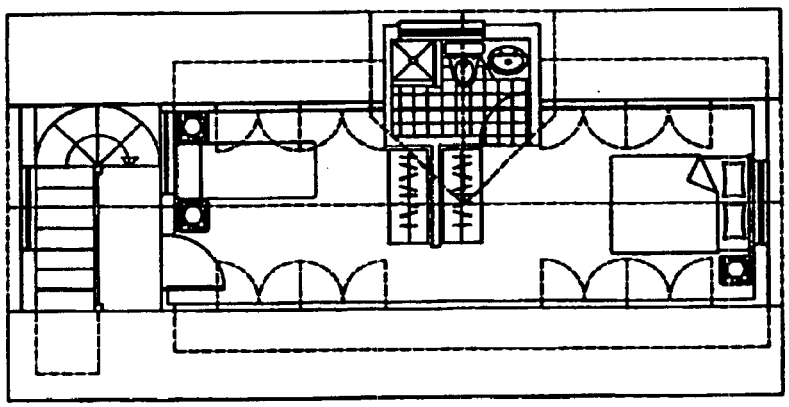

FIG. 24 comprises top views FIGS. 24(a) and 24(b) of two layouts for an upper level of a housing unit and a top view FIG. 24(c) of an attic space within the apex, with roof expansion.

Figure 25:
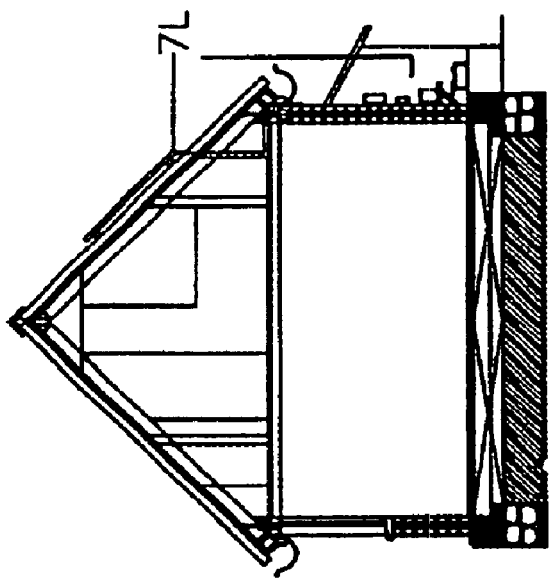
Figure 25:
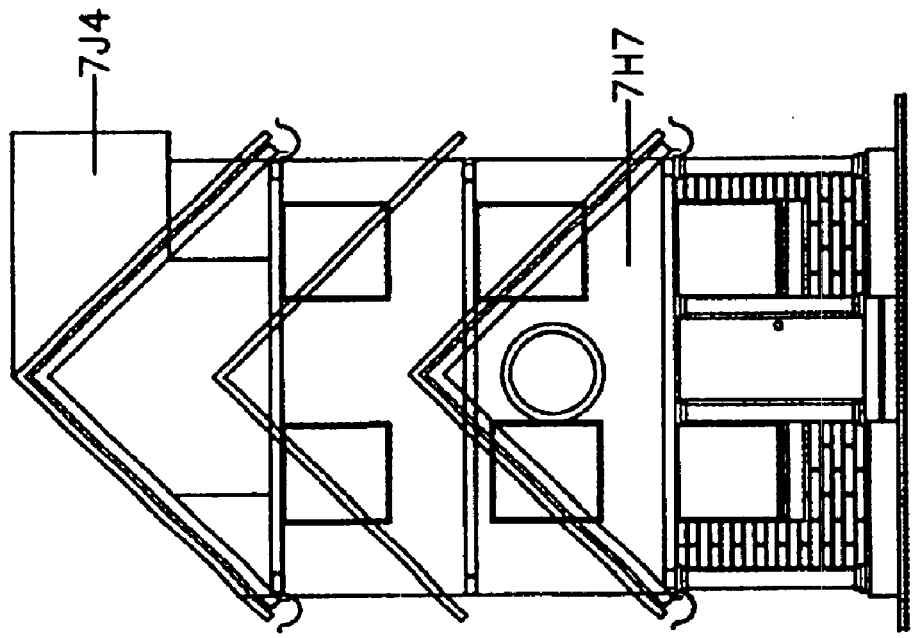

FIG. 25 comprises a view FIG. 25(a) of how the building unit can be raised to more than one storey, (with roof extension part) and a view FIG. 25(b) of a single storey building equipped with a solar energy system.

FIG. 26 comprises a front view FIG. 26(a) of a single storey housing unit and a front view FIG. 26(b) of a three storey housing unit.

FIG. 27 is a side view of the upward expansion of a single storey to a potential three storey unit.

Figure 28:
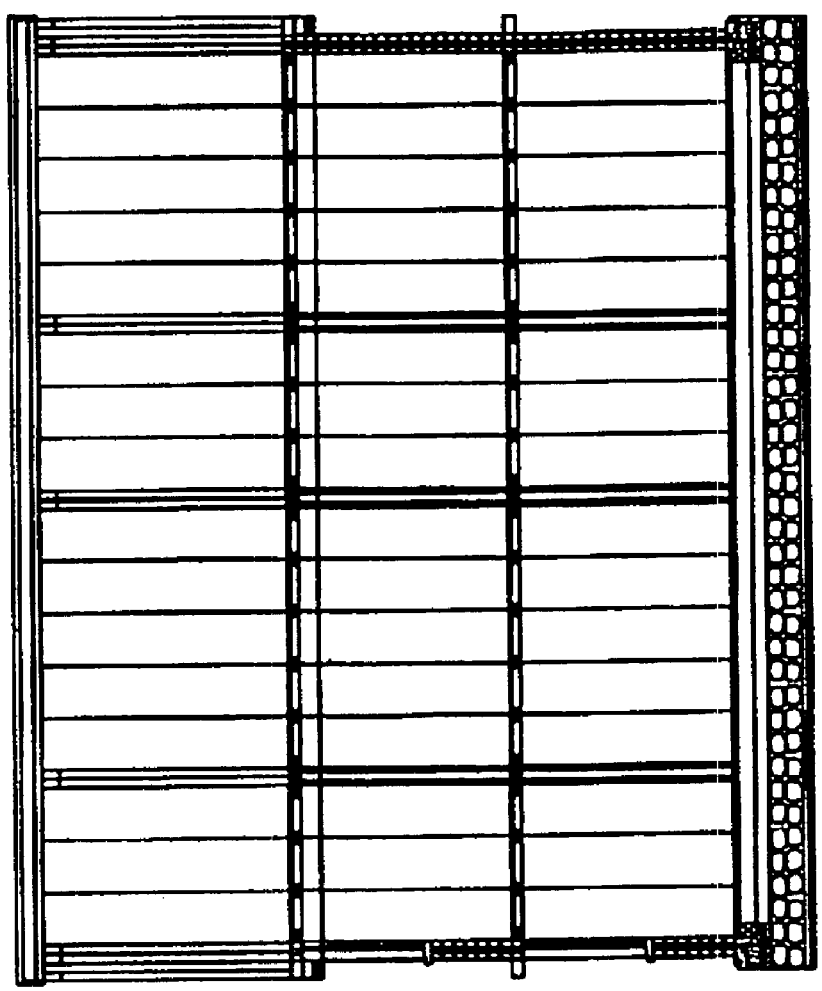

FIG. 28 is a side view of the three storey unit comparable to that of FIG. 26(b).

FIG. 29 is a top view of a layout of outside and an interior wall with sliding door.

FIG. 30. is a top view similar to the layout of FIG. 29, but with a relocation of the sliding door.

6. DETAILED DESCRIPTION OF THE BUILDING PROCESS IN CONJUNCTION WITH THE PARTS AND COMPONENTS LISTING IN SECTION 7

6.1 Foundations 6.2 Walls, floors, and ceilings (windows, doors, and furniture) and electric and sanitary installations.

6.3 Dismountable roof 6.4 Modules 6.5 Windows 6.6 Floors and ceilings 6.7 Mobile walls 6.8 Ducts and channels 6.9 Stairs.

6.1 Foundations

I will describe the building process starting with how foundations are built and continuing until the description of how the roof is mounted. (This will be done following the Summary of Enumerated Components by Section 7.)

Element #7A1, the foundation of the part of the building that is buried, is made out of concrete. An iron grill, that will be the base and will level out the structure in general and help avoid the shifting of the structure, is part of this concrete structure. The iron rods of the grill are reinforced, so that they can be used in the building, and are pre-welded, forming in this way a grill over which concrete is poured. This is the base for a chain that will support the perimeter of the whole building. The fastening chain is made up of modules with intermediate columns #7C5, according to multiples of the basic measure of each building block. Over this base, the bottom parts of columns or corner plinths will be placed as well as intermediate fastening chains #7A3, and a double row of foundation stones #7A2. Concrete mortar will help join these elements together.

This mortar will be poured over the spaces between the bottom parts of the columns or plinths. This will constitute the base of the foundation beam #7B2. its depth will depend on the geological composition of the soil. The bottom parts of the columns and plinths are prefabricated elements which have an iron fastening chain which will allow the foundation beams to be supported. Many structural alternatives will be analyzed.

The stability and firmness of the project's structure will depend on the foundation. This foundation distributes, in a homogeneous way, loads and transmitted stresses, as it is a bearing structure. In this manner, all of the forces are absorbed uniformly by the ground.

A semi-deep structure has been proposed, due to the possibility of having up to three floors and its size and form should be determined by the dimensions of the floor plan.

The beams and capitals of the columns or plinths will provide stability during the building process to the prefabricated elements. The concrete structure will give stability to the foundation that is built on top of it. The stone foundation will provide the characteristics of Cyclopean concrete on which the foundation beam and columns are set. Before the mortar is poured, water and drainage pipes will be installed, for drainage and other purposes.

The reinforced concrete of the foundation beam will resist different compression loads. The iron rods will absorb flection stresses.

The walls are bearing structures and enclose different spaces, and every 60 centimeters, between axis, reinforced concrete columns are created, at the vertical ducts.

Before setting the prefabricated foundation beam, rubber bearings (#7B1) have to be considered (their use is optional), as they absorb loads, as well as seismic movements and vibrations.

This rubber product, made in Ecuador, is used to support platforms which form bridges over beams and columns. Their technical characteristics are endorsed by their manufacturer. This element will be placed between columns and in the perimeter of the basic modular structure. Their sizes will depend on the use given to these modules, that is if they will be placed under the foundation beam or over the stone foundation. This rubber bearing, which will be placed between the buried foundation and the visible foundation beam, will help to absorb seismic movements and natural and permanent vibrations that any construction may experience.

The foundation beam #7B2 is made of reinforced concrete in whose structure the following components are placed: iron chain #7B3 (which fits into the columns), a non-threaded rod #7B6 and a threaded rod #7B4. These rods are structural which support the wall connector #7E that juts out of the beam until it reaches the first row of building blocks, every 60 centimeters between axis. In this way, a superstructure is formed over the foundation beam, with the first row of building blocks. The concrete, to be poured over this first row, has a different composition from the rest, like for example from the concrete that is poured into the ducts of the wall blocks, as it is lightened. With the interior side of the foundation beam and jointly with the fastening beams the letter L is formed.

In the lower part the iron beams will be supported and anchored. They will remain secured to the foundation beam with the help of a threaded rod #7B6.1 which will be cast in the foundation beam. This structure will exist every 60 centimeters, starting with first floor beam, tightened with a chaser and a locknut, which will remain below the upper side of the beam.

The component #7B6.1, which is the threaded rod of the wall, will be connected to the threaded connector #7E that fits into this rod. The rod is located in the U-shaped part of the foundation beam up to the first row of wall building blocks. After placing the threaded structural rods #7B4 and the non-threaded structural rods #7B4, which alternate every 60 centimeters, and after the first row of blocks is placed on top of the foundation beam, the mortar can be poured into the big ducts of the blocks. (The mortar should not be poured into the vertical ducts which are one inch wide.) The mortar should be poured until the process is concluded for the first row of blocks with the U-shaped part #4B8 of the foundation beam and the anchoring of the columns. Once this is done, the stopper of the vertical duct, which is one inch wide, should be removed. (The same process should be followed for each row of building blocks until the top beam is reached or until the wall has been built).

After casting with concrete the buried foundation, the foundation beam with the threaded rods with connectors #7E, with non-threaded rods #7B6.1 and with internal rods #7B6.2, and the fastening beams (whose shape resembles an inverted T), we should continue with the traversing floor beams. These should be fastened to the Internal rods #7B6.2 with a lock-ring and a common nut, in the workpiece of the floor beam. The chaser and nut will not be visible from the upper side of the beam and its extremes. An empty space will exist between the definitive floor, the floor beams and the ground floor level. This empty space can be used for electric and sanitary installations and to allow airflow.

The floor beams #7I1 are different from the beams used for ceilings #7I3 since their cross-sections are 20 centimeters×10 centimeters and 10 centimeters×10 centimeters. Both the length and width of the beams themselves are the same, as well as the flap which is used to fasten them to the floor modules. (These will be described in the section corresponding to floor, ceiling, and roof modules.)

6.2 Walls

After building the walls, we will be able to distinguish between the blocks used for corners columns #7C4, blocks used for fastening columns #7C5, window blocks #7C6, door blocks #7C7 and #7C8, according to their enumeration. Modular blocks #7C2 and modular half-blocks alternate to form wall ducts, and they will coincide, in the same in which vertical ducts coincide. Vertical ducts are used for different installations and for pouring the concrete. The horizontal channels, used for installations, are connected with vertical ducts in a tangential way so that horizontal and vertical connections can be joined. These horizontal channels can be used to install cables horizontally, which will be used for water, electricity, phone, etc. installations, internally, and to place gaskets between blocks, which will be visible externally.

As we are building the walls, we will notice the empty spaces left for side windows #7C11 as well as wall blocks #7C2 and columns #7C4. We will also be able to see the empty spaces to be used for facade windows which are close to the column blocks #7C5. We will also see the empty spaces left for the main door that are close to the windows of the main facade #7C11 and the space left for the rear lateral door, which define the different ways to access the internal part of the space and enclose the perimeter of this space.

Concrete will be poured through the block ducts, through which wall rods are placed (which are threaded at both extremes) and this should be done starting from the top beam. The ducts coincide in their open extremes with the empty spaces for windows and with the half-duct of the column blocks, through which the mortar will be poured, in the same manner. The mortar should be poured only after installing the window #7C11 with its anchors and before the top beam is placed. In the internal part of these blocks with half-ducts the windows anchors will be cast, which will allow the window to be securely fastened. The same process should be repeated with the door frames, that is with the main, the lateral, and the courtyard door frames. The modules correspond to blocks #7C7 and #7C8, which have different anchors for the door. As an esthetic alternative, to be used for the main facade, column-facade blocks can be used, since they have a rounded and rectangular form.

After placing the windows #7C11 and door frames #7K4, the blocks corresponding to the top beam #7C1 are placed. These are different from the modular blocks #7C2, half-modular blocks #7C3, corner column blocks #7C4, intermediate fastening column blocks #7C5, since these correspond to the same dimensions as the main facade #7D1, rear facade #7D2, internal dividing wall #7D5, and the dimensions between intermediate lateral columns, and its iron chain, with which it forms its structure.

The empty ducts would not be used unless the proper equipment for cold or warm airflow is installed. (This depends on the climate of the season.) The solar energy system #7L can be installed starting at the roof. This is optional, but since they are part of this building system, and since they can be left for possible future vertical expansions, the empty ducts will stay connected with the top beam.

The top beam of each floor has been built in such a way that it can cover the spaces left between columns. The largest one will be the one that is the same size as the main facade or the rear facade (#7D1, #7D2, #7D5, #7D7), or the ones placed between lateral columns #7D6. This dimension can vary as it depends on the modules of the spaces to be built.

The lower profile of the top beam #7D has the same profile as the wall module block, where it fits. This profile should be fastened in its extremes to corner column blocks #7C4 and to intermediate column blocks #7C5. This is done with the help of an iron structure #7D3. This is a pre-welded beam that is placed on the U-shaped part of the top beam. The wall connection rod #7B4 traverses this U-shaped part of the beam. The rod reaches the half-duct of the columns, after the channel, with its structure, and the rods, with their connectors, have been joined together after the mortar was poured on them. The top beams also become the door and window lintels and will support the dismountable structure of the roof. The empty spaces of the empty ducts will be maintained, just in case additional floors are added, so that they can be used for future installations.

Out of each structural wall rod #7B4 a beam-holder box for ceilings #7I4 sticks out towards the internal part of the building. Structural wall rods are placed every 60 centimeters, between axis. The beam-holder box fits into the rods by using a hole. This metal box, whose shape resembles a staircase, has a base and a fastening bolt where the ceiling beam (#7I3) is embedded. The box has the same width as the ceiling beam and not the same height as the top beam. This beam is fastened with a nut and lost chaser at the same as the top level of the ceiling beam (#7I3).

Up to now we have described the building process for foundations, internal and external walls. The internal wall will be fastened with wall blocks #7C9 and #7C10. Exterior walls will separate the rear spaces or courtyard from the internal or house which is inside. Bathroom and kitchen walls will be described later, in cases where a house is being built. These walls can be mobile.

6.3 Roof

The wall rods jut out until they reach the upper part of the roof beam. They traverse the rubber beam-supporters #7F1 which are placed every 60 cms.

The following components are found here: connectors #7E, beam-supporters #7F1. This beam-supporter is made out of rubber and has a triangular shape, through which a rod with a connector traverses, at its central axis point. There is also a special spiral (#7F2) here which is fastened internally to the beam-supporter with a chaser and bolt and which also tightens the beam-supporter to the top beam. This helps in absorbing seismic movements and vibrations. The hole in the beam-supporter #7F1 is centered with regards to the roof beam #7F5 and is the axis for the rod and connector. Its diameter is the same as the external diameter of the connector, which should be adjusted by pressing it and which can be used to tighten the following: roof beam, beam-supporter, beam-top and wall until the foundation beam is reached.

The beam-supporter is made out of rubber and has the same production characteristics as the foundation bearing previously described.

When the roof beams are placed over the beam-supporter forming a 45-degree angle, the rod with the connector and the part of the rod which enters the roof beam are screwed in. This accomplishes two things: the roof beams #7F4 and #7F5 are tightened, with nuts and bolts, and the new connector #7E is included where the starting block #7D4 is placed. This is where the second floor with walls will be placed, if the building is expanded.

Before describing how the building can be expanded vertically, I will give additional details regarding the roof construction. This is subsystem # 6.3. After that I will describe how the floor and ceiling modules will be installed, over the roof beams, once the roof modules have been completely installed.

Since the roof beams #7F4 and #7F5 have been placed at a 45-degree angle, we can see that we have obtained a triangular shape or an A-shape. The place where the beams meet is the upper part of the roof, which is what is fastened to the beam-supporter. What juts out from the top beam onto the lateral facade is part of the roof system. This system is composed of the union of roof beams which are held together at a meeting point with the help of a connector with a joining beam-holder box #7F6 and #7F7. This box joins secondary beams #7F8 which hold together the structure of main beams, placed in a longitudinal direction, with the bolts to this box. This box is part of the connectors #7F7 of roof beams. In this way all of the elements of the roof structure are now ready to receive the roof modules. But before doing all of this, the structure #7H for structural support has to be placed internally under the roof.

Wherever there are fastening columns, there should be a double roof beam #7F4. Between these columns there should be a space (in the same manner as between single beams of 60 centimeters) where a cover #7F9 (for spaces between beams) is placed. This will stop the wind or animals from entering the house.

Space Available Under the Roof (Garret or Attic)

The space available under the roof, which can be thought of as an expansion of the house after having built the first floor, which is also commonly known as <<the attic or garret>> (#7H), which is located under the roof beams, is composed of a structure that allows the house to be more secure structurally.

Under the union beams #7F8 a bridge #7H1 is formed. This helps to secure the whole structure to the roof beams. This structure's right-side supports #7H2 will support the top part of the roof beams. The transversal joists #7H3 as well as the right-side supports and bridge are complete elements which provide transversal support.

This structure is located under the double fastening beams of the roof and over the double fastening beams of the ceiling. As I have mentioned previously, all of these elements will be part of the structure of the top perimetric beam, on which the roof will be supported.

The transversal joists will not reach the joint with the beam-supporter. Between these two elements there will be this UNUSABLE SPACE, which is an empty triangular-shaped space. Because of this, the USEFUL SPACE, under the roof, has a smaller area than that of the ground floor of the house.

This structure will remain screwed onto the double beams of the roof, and fastened to the ceiling beams that fasten the lop beam transversally so there will be an empty space for airflow between the right-side supports.

The longitudinal joists #7H4 extend from the double beams to the roof double beams and after being joined to the transversal joists #7H3, they help out in defining the internal structure modules, where roof beams are supported and joined together. These joists, as part of their structural function, also help avoid the flection of roof beams, and lighten the loads that push towards the ridge cap. They also will become part of the structure for the ceiling modules and the cover for the vertical section of the walls. These sections can be covered with half-boards, triplex or plywood wood, plycem, gypsum, etc. #7H5. The bridge structure #7H1, right-side supports #7H2, and transversal joists #7H3 are also placed under the beams #7F3 and #7F4, which correspond to the modules between the column axis.

THE EMPTY UNUSABLE SPACE, which has a triangular shape which is formed between the longitudinal joists and the beam-supporter, and is located over the ceiling beams, can be covered with ceiling modules. These modules will not be visible from below the structure.

If ceiling beams and floor modules are placed, the structure will form a usable space, known also as atic or garret, etc. As I mentioned before, this space can be used to increase the amount of space or area that either the ground floor or the upper floors have.

If the internal covering material covers the whole structure or structural support, the purlines, which can be installed optionally, will be visible. These purlines #7H6 will join the longitudinal roof beams. These beams are the ones that jut out around 20 centimeters of the front and rear facades so that the roof can have an eave that will protect the facades.

These purlines are placed at both sides and also over the bridge #7H1. They are also located under the right-side support and under the roof beam. There can be others between the roof beams and the transversal joists, under the point where the beams meet at the ridge cap, providing additional support to the secondary union beams already described. All of these purlines traverse the building in a longitudinal direction from the front facade to the rear one.

In this manner, the roof is property structured with the components described. We have also seen how it can be covered with a material internally and how the USEFUL SPACE UNDER THE ROOF can be made available to be used.

The dismounting process of this support structure should be done carefully and following a system, due to the large amount of components that are part of it. Probably the lengthiest process is the one concerning the mounting and dismounting of the structure. All of the components must be kept in good conditions, if possible, so that it won't be necessary to purchase new ones.

6.4 Roof Modules

The roof module #7G8 is similar to the ceiling and floor modules #7I2. The only difference is that it must be treated with resin and waterproofing substances. The same resins and substances should be used between modules so that the water can't seep through to the inside of the building. These also help to make the building resist changes in the climate. The roof module #7G8 is composed of cement containing agglomerate sheets, which have central channels that traverse the width of the module internally, from side to side. In both extremes, there is half of a channel, that allows you to install between two modules a flap-like joint #7G2. This joint can be placed between the modules. It can glide along these channels from the beginning to the end of the roof module, along its whole length. These internal channels can also be used to install thermic cables, as something optional, as we saw could be done with the floor and ceiling modules.

In the same way as the roof beams #7F3 and #7F11 have flaps (whose shape resembles inverted L's) welded every few centimeters, the roof module #7G8 also has a flap which resembles an inverted metallic Z. This module can be fastened to the beam's flap by gliding the roof module over the beam and making the two flaps coincide at the same place. In this way the roof modules will remain fastened and secure, in the same way as the floor modules are fastened. The purline #7H6 that traverses the roof beams on the bottom side, will act as the limit of the roof modules.

After installing the roof beams #7F3 and #7F11 and the modules #7G8, the roof's top cover #7F12 can be placed. This is a metallic fastening component which acts as a roof pinnacle, which should be securely placed. Other components can be placed over the roof modules, such as undulating roofs like eternit, eurolit, metallic roofs, ceramic roof tiles, concrete roof tiles, asphaltic roof tiles, just to mention a few of the roofs that are best known. They can be used along with their corresponding ridge cap #7F4.

To conclude the roof, in its lower side, we can place a component which resembles a purline #4G9. This component can traverse the roof beams and be placed at their extremes, so that a water-protector #7G6 can be installed. This protector would be hooked and sealed between this purline (#7G9) and the last inferior roof module. This protector has the same shape or follows the outline of the roof beam. Then it forms an angle which juts out of the bottom part of the beam, so that the water will drip onto the rainwater gutter #7G7.

The rainwater gutter is fastened to the top beam with plugs and screws whose holes are predetermined by factories.

6.5 Windows and Doors

The window #7C11, in whose lower side there is a recess which juts out from the wall's level, has a half-channel like a water-dripping scroll. The window has a standard size too. Metallic window shutters can be installed optionally, for additional security. Flower-boxes can be installed in front and under the recesses.

The windows #7C11 and doom #7K4 can be made out of metal so that they will last longer and provide additional security.

6.6 Floor and Ceiling Modules

Now is the right time to install the ceiling and floor modules #7I2. As we mentioned in the section corresponding to roof modules, the modules used for ceilings and floors are the same, except that the latter have a poll-vinyllic pre-finishing coat, with which it is already coated at the factory. After installing these modules, as a result a perfectly finished floor is obtained, very quickly, without having to install different types of floor coverings. If so desired, these can installed later. For example the following floor coverings can be installed: ceramic floors, parquet flooring, vinyl, carpets, etc.

6.7 Mobile Walls

The interior walls, such as the ones used for kitchens and bathrooms, are conventional walls, which can be made out of #8 intercalated building blocks. The interior of the walls can be painted, plastered with stucco, plastered, whitewashed so that ceramic products can be adhered, wallpapered, etc., according to the owner's wish.

Water pipes should be placed externally and should follow the foundation beam, which is buried in the lower workpiece of the beam. When these pipes are used within the building, either for the bathroom or the kitchen, the foundation beam should be used as well as the horizontal and vertical ducts.

Sewage water installations have to leave the building and will be connected to visible and recorded pipes. The same thing should be done with rainwater pipes and ducts used for gas disposal. The lateral facade wall should be used for this purpose. If the house is located right next to another house the ducts inside the wall blocks should be utilized. These pipes are covered with metallic channels in single separate houses. Instead in sets of houses, pipe installation must be done internally.

6.8 Ducts and Channels

Whenever the house is expanded or a space is built with this system, it is necessary to repeat some processes after the roof has been dismounted, starting with the starting block #7D4 for the upper walls. Modular walls and columns, ceilings, windows, doors, and new installations (that are within ducts and channels) have to be interconnected between each other. The new top beam and the column fastened beams can be used to reinstall the dismounted roof, if this needed for the next floor. This means that this would be done after erecting the second floor, which is where the construction will end.

This great variety of ducts and channels can have special characteristics, that is this is where special installations can be made, which will be connected to a centralized computerized panel. This will allow us to create an integrated system to obtain, in a very sophisticated manner, THE INTELLIGENT HOUSE (THE HOUSE THAT EXPANDS), as cutting-edge technology can be applied in a very simple form.

6.9 Staircase

The prefabricated staircase system will be installed in the rear courtyard. It consists in supporting and assembly columns for the prefabricated steps on the beam where the columns are joined. The steps themselves would be screwed into these columns. A component, made out of reinforced concrete which is joined with the iron structure, can be used as part of the circulation area and access area for each floor. This staircase will be used if th house were expanded.

7. Summary of Enumerated Components by Section

7.A. Buried foundation
7.B. Foundation beams, walls and windows
7.C. Wall blocks, modular windows
7.D. Top beams
7.E. Rod connector
7.F. Roof 7.G. Roof modules
7.H. Usable space under the roof
7.I. Floors and ceilings
7.J. Stairs, landings, and skylights
7.K Furniture, sanitary installations, and doors
7.L. Solar energy.
Section 7.A. Buried Foundations
7.A.1. Reinforced concrete base
7.A.2. Stone foundations
7.A.3. Plinths and column supports
7.A.4. Constructive detail of the foundation
Section 7.B. Foundation Beams, Walls, and Windows
7.B.1. Rubber bearing
7.B.2. Foundation and fastening beam
7.B.3. Iron chain
7.B.4. Threaded rod for the connector, for the wall
7.B.5. Beam socket for the column supports
7.B.6. Non-threaded rod used for anchoring floor beams
7.B.7. Structural rods for wall blocks
7.B.8. Channel used for reinforcing iron
7.B.9. Water pipes
7.B.10. Threaded rod for intermediate columns
7.B.11. Threaded rod for the facade columns.
Section 7.C. Different Wall Blocks
7.C.1. First row of blocks and block placement up to the top beam
7.C.2. Complete basic block
7.C.3. Half-blocks
7.C.4. Round and straight blocks used for corner columns
7.C.5. Blocks used for intermediate fastening columns
7.C.6. Window and column blocks
7.C.7. Blocks used for main doors
7.C.8. Blocks used for lateral doors
7.C.9. Block used for fastening walls with interior walls
7.C.10. Sliding door
7.C.11. Modular window.
Section 7.D. Top Beams and Small Beams
7.D.1. Main facade
7.D.2. Rear facade
7.D.3. Structure for the top beam
7.D.4. Blocks used to start building new floors
7.D.5. Small beams for dividing walls
7.D.6. Small beams for intermediate columns of lateral walls
7.D.7. Small beams for intermediate top beams.
Section 7.E Rod Connectors
Section 7.F. Roof
7.F.1. Beam-supporters
7.F.2. Spiral and connector
7.F.3. Intermediate main double roof beams of the main and rear facades
7.F.4. Double fastening beams for lateral columns
7.F.5. Single modular beams for the roof
7.F.6. Connector for double beams
7.F.7. Connectors for single modular beams
7.F.8. Secondary joint beams
7.F.9. Cover for spaces between beams
7.F.10. Connecting angle
7.F.11. Intermediate simple beams
7.F.12. Top roof cover.
Section 7.G. Roof
7.G.1. Traversing connector for the roof ridge cap cover
7.G.2. Flap
7.G.3. Different afternatives for the roof
7.G.4. Ridge cap
7.G.5. Module to be used as starting wall for other floors or starting blocks
7.G.6. Water protector
7.G.7. Rainwater gutter
7.G.8. Roof module
7.G.9. Inferior purline.
Section 7.H. Useful Space Under the Roof. Structural Support.
7.H.1. Bridge
7.H.2. Right-side supports
7.H.3. Transversal Joists
7.H.4. Longitudinal joists
7.H.5. Interior material covering for the usable space
7.H.6. Longitudinal purlines
7.H.7. Facade cover (shaped as a the letter A).
Section 7.I. Floors and Ceilings
7.I.1. Floor beams
7.I.2. Floor modules
7.I.3. Ceiling beams and floor modules
7.I.4. Beam-holder box for the ceiling
7.I.5. Roof modules
7.I.6. Bolt for fastening beams
7.I.7. Flat ceiling
7.I.8. Cooling system.
Section 7.J. Staircases, Landings, and Skylights
7.J.1. Staircases and landings
7.J.2. Access to the space between the ceiling and the floor (which is under the roof). Marine staircase and/or lost staircase.
7.J.3. Skylights
7.J.4. Roof expansions
Section 7.K. Sanitary Systems, Kitchens, and Doors
7.K.1. Sanitary systems
7.K.2. Mobile wall for the kitchen
7.K.3. Furniture
7.K.4. Door and door frame.
Section 7.L. Solar Energy System
8. Expansion Alternative The space between the roof and the ceiling can be used to increase the amount of usable space. This space has the shape of the letter A. To access this space a staircase of the type known as marine or a lost staircase, can be used so that there won't be any interference with the circulation area, which leads to the other floors. This space, shaped as an A, can be used if the house has a single ground floor.

The area that forms the letter A, both on the front and rear facades can be seen as A-shaped skeletons, to which external and internal covers are secured. These covers can be made out of wood, of covered plywood wood, of Un plate, of sheets made out of fiber-cement. To increase the amount of light entering internal spaces, these sheets have a glass rosette, which also make the facades more esthetically pleasing. These covers can also consist of a modular window or an access door which leads to the rear circulation area.

The front door columns or the ones at the corners can have either a rectangular or a circular shape, to make the whole building look nicer.

9. Solar Energy, Recycling and Aggregates

It is important for us to mention two technologies which can be applied to the building process: recycling and solar energy.

Recycling is a technology developed in highly industrialized countries and has reached a very high performance degree. The U.S.A. I. A. supports research and the recycling of different products, especially products which belong to the agricultural sector, in which countries such as Ecuador wastes fibers such as rice hull, soy hull, coconut shells, etc. If these products are used to manufacture different building products and components this will contribute towards the protection of the environment, and towards destroying it less, as we, currently, burn hull and pollute rivers by throwing agricultural waste products into them. This will be the next phase of this system and a way to extend the patent. Different associations, specialized firms, financial and research organizations are interested in supporting the productive and commercial development of agricultural recycling processes, which can be used to decrease building costs and to make the costs of building more within the reach of all population.

Solar energy is abundant in the country, which has many sunny days. This energy has not been taken advantage of, that is, it has been wasted. This is the natural alternative energy which is less costly, silent, clean and ecologically sound. The State University of Washington has programs and services for the development of communal energy with solar energy. This university supports research and the installation of this system both within the United States as well as in the rest of the world.

I am describing, with different drawings, how the installation of this technology is designed. It can be used to heat water, to produce electric energy, to pump water to remote sites or at buildings used for tourism, housing projects, and for educational purposes, etc. If solar energy is used, we will not have to depend on other types of energy which can pollute, are limited, and are traditional.

This also implies that attitudes and mentalities must change. This also implies that natural resources will be taken advantage of to develop the country and to provide solutions in specific areas such as housing projects, tourism, education, and others.

All of the changes, improvements or features added to the system, will become the sole property of the inventor, and they should be, in general, related to the -general focus of the system or to one of its components, specifically, or to the combination of the different systems.

Additionally, periodically, there will be a presentation of the details of the subsystems. The subsystems consist of the wall systems with insulation and components which include recycling, the floor system, with ducts for the installation of thermic cables in the center of the modules and whose shapes resemble serpentines and the system that consists of solar energy used in different ways. The purpose of installing the thermic cable is to have floors, ceilings and a roof with a controlled range of temperatures. This is controlled from inside. Solar energy can be used in these different ways: water heating, electric energy, water pumping, communications, refrigeration, etc.

Once the use of earthcement, recycled products, and other elements that will lower building costs, are ready to be applied, we will be contributing towards making building costs more within reach of all of the population. This is why I am requesting that the proposed solution be declared as a matter of national interest and social priority, which might be considered as a State policy.

10. Hybrid Combinations

When this system is expanded in the future, and when new applications of the system are found, iron structures will be combined with concrete and wood structures, which will be superimposed on the initial system, thus creating a great variety of HYBRID BUILDING SYSTEMS which the user can choose between, as possible alternative solutions.

This system's purpose is to solve the deficit of building spaces which can be used for housing projects, tourism, education, and others, both in urban sectors as well as rural and remote sectors. The building materials are packed and are sent to the place where the building will be erected, along with very few tools, with labourers with not too much training, where there will be a lot of initiative and communal effort, such as the one found in communitary work. Sets of buildings with great esthetic appeal, a lot of quality, and which will last a long time, will be constructed in this way.

11. Prefabricated Systems

Focused Theme: Housing Projects

There is a large supply of prefabricated houses, with a great architectural design and with similar building characteristics as the conventional house. In industrialized countries, there is a great variety of styles, sizes, and prices, with the advantage that money and time can be saved with this system, since the components are made at a factory. These components look like traditional ones.

Around 60 years ago, the first prefabricated houses were made and built in the United States. Both inventors as well as manufacturing firms, such as Sears Roebuck and Frank Lloyd Wright, designed prefabricated houses for low income families. Nowadays, these structures are sent to a specific site all packed up and in all kinds of sizes. They are then erected in a few days, without causing the same disturbances as traditional types of constructions. They are also exported to many countries.

The architect, who wants to design prefabricated houses, should familiarize himself (or herself) with manufacturing and building systems, building codes, materials to be used, that is: the use of technology, taking advantage of computer programs that might solve the different problems encountered in the different fields of prefabricated building processes. Before leaving the factory where it was manufactured, the house receives quality control and all of its parts are verified. It is not possible to do this when we are dealing with conventional building processes that erect a building at a particular place.

The prefabricated house, or the one that is manufactured at a factory, will arrive at a site, with its parts property enumerated and packed, with the assembly instructions. Depending on the type of system, erecting the house will take a short time, probably longer in some cases, and consequently both time and money will be saved.

In many cases, the idea of "DOING IT YOURSELF" or communitary work, are the best possible way to start to change the customs and ideas of society.

It is not easy to change these, in most cases, but it is necessary to take the initiative as soon as possible, in order to adapt ourselves to new technologies.

Different prefabricated systems manufacture building components in different ways. The components can be parts, basic elements or whole sections of the building. These are then transported appropriately to the building site.

This activity creates new types of employment, such as: manufacturers, builders, assemblers, promoters, financial advisors, specialized salespersons, contractors, subcontractors, etc.

If a certain technology has reached a certain development point, it is possible to manufacture components made to order.

These are several of the different types of prefabricated components that can exist:

prefabricated panels made out of wood, with two wooden panels and in between these two a material called "estiropor"

tongued and grooved wooden logs completely cut to correspond to a module size and assembled at the factory skeleton-like or a structure made out of wood and panels metallic structure and insulating panels panels made out of a metallic grid and estiropor, etc.
concrete components with plank molding
hand-crafted
mobile
wood frames.

These building systems are the main ones, and they are not known in our country. These are used in the system MULTIESPACIO 2000 and when applied to housing projects they are know as: THE HOUSE THAT EXPANDS.

Since around 95% of the components are prefabricated, with a simple manufacturing process, without any special machinery being required, with the labor necessary.

Architectural Proposal

12. Architectural Conception

Basic spaces
Basic house
Modifiable ground floor
Expansion of the first floor
Expansion of the second floor
Dismountable roof
Usable space under the roof
The kitchen as part of the ground floor
The kitchen as an integral part of the dining room (a transformation)
Shared bathrooms
Main bedroom and family room.

The first basic problem is to obtain a one-bedroom house with all of the basic services provided. For this we have small building area: 10.6 meters×5.2 meters. This is equal to 55.12 square meters, which is where the HOUSE THAT EXPANDS will be erected.

It is necessary to describe the house so that we can establish which basic requirements need to be fulfilled:

| | | | |
|---|---|---|---|
| Bedroom: | 3 m. × 4.8 m. available | 14.4 m. | queen-size bed large closet a lot of circulation space |
| Kitchen | 1.8 m. × (1.15) available | 2.07 m.$^2$ | kitchen, sink kitchen furniture for supplies, refrigerator |
| Living and Dining Room | 3 m. × 4.8 m. available | 14.4 m.$^2$ | dining room set for 4 people and sideboard living room set for 4 people Circulation areas main area starting at the main entrance area |
| Bathroom | 1.8 m. × 2 m. available | 3.6 m.$^2$ | complete bathroom: shower area, toilet, washbasin, two access doors, (one that leads to the bedroom and another that leads to the social area), its use will be shared. |
| Courtyard | 4.8 m. × 1.8 m. available | 8.64 m.$^2$ | space to be used for the washer, dryer, water heater tank. This will be accessed by an external door and by a door leading to the bedroom. |

This courtyard is the space where the staircase, that leads to the second and third floor when the house is expanded, is erected. These components are prefabricated and are made to order at the factory. Its installation is quite simple and done quickly. And it can be done by the house owner.

The main entrance, with its two lateral windows, has dimensions that corresponds to the modules (in the same way as the floor plan corresponds to these). The basic module's size is 0.60 m. (lengthwise)×0.20 m. (widthwise), 0.13 m (high) and this is also the block that is the main component of the walls.

The blocks that are part of the columns will characterize the entrance in a certain way due to their rectangular or round form. Their pinnacle is a capital or a classic form that highlight the main facade. This visual and esthetic effect, of the door and windows, with its corner columns create a traditional style, which is what we want to achieve so that this style will be more widely and easily accepted.

As a possible option, windows can have window shutters and at the lower part of the window or at its recesses, prefabricated cement garden-boxes can be placed. The shutters can be fasted internally, which makes the house more secure, in its exterior. The main, lateral, and courtyard doors can be made out of metal, to provide additional security.

The interior surface, as described in the descriptive study, consists of floors that are already provided with a surface finish at the factory itself. And the walls, which after being built still have the blocks visible, can be painted, plastered with stucco, whitewashed or covered with other materials.

The kitchen floors can be treated additionally with some water-proof material, or ceramic tiles can be installed.

The bathroom floors, walls, and showering area can also be covered by ceramic products. The shower itself can be prefabricated and made out of a highly resistant plastic. The toilet, faucets, and accessories are made in Ecuador, but the owner can choose to change these, if he or she so desires.

The bedroom is big enough to fit a queen-size bed with two bedside tables. The closet itself is sufficiently large as to be used by a couple. This closet dimensions also correspond to the basic modules. It is prefabricated and dismountable if the room needs to be transformed into something else.

This description of the interior spaces can be modified so that it can be furnished pleasantly with pleasant wall coverings, and with an indirect lighting system, a comfortable and cozy effect can be achieved.

If there need to be additional spaces for the front garden, the back courtyard, a lateral garage and for other uses, the original estimated area will be duplicated. This does not necessarily mean that an additional investment needs to be made as the vertical space available can be used to erect additional floors for the HOUSE THAT EXPANDS.

MODIFIABLE GROUND FLOOR. I have mentioned that the kitchen walls are mobile, and if the house is expanded by adding a first floor, the bedroom can become a large dining room, and the dining and living mom area can become just a living room.

This means that, on the ground floor, we would only have a living room, a kitchen with a breakfast area open to the dining room, a dining room, and a complete bath. In the courtyard, the staircase would be built, which decreases the uses that can be given to this space, but allowing the upper floors to be accessed.

Useful Space Under the Roof (Attic or Garret)

There are two possible options regarding this space: either a ceiling can be built or without a ceiling. Without a ceiling, we would be able to see the roof from below.

Since the bean-holder boxes will be installed anyway, even if no ceiling is placed, the user should decide how much he or she would like to spend, and in this way, the prefabricated and modular components will be bought to include a ceiling for this space. If the user decides to build this ceiling, the amount of usable space will increase, since beneath the roof, an A-shaped area will exist. This area can be used as a library, a pantry, a guest room, etc.

It is easy to access this area, as it can be done directly from the lower floor or from the circulation area, if a marine or lost staircase is built.

The usable space consists of the following components: bridge #7H1, right-side supports #7H2, transversal joists #7H3, longitudinal joists #7H4, interior covering material, and longitudinal purlines #7H6.

The usable space under the roof constitutes an expansion to the first floor of the house and is commonly known as an attic or garret, as well as a structure that can be covered with decorative materials.

Under the union beams #7F8 a bridge #7H1 can be built, which will secure the complete structure to the roof beams. This structure's right-side supports #7H2 can support the top part of the roof beams, the transversal joists #7H3 and if they are taken as a whole with the right-side supports and with the bridge, they constitute complete support components.

This structure will be located under the double fastening roof beams, and over the double fastening ceiling beams, which, as I have already mentioned, will always form part of the top beam structure which follows the perimeter. This structure is where the roof will be set.

The transversal joists do not reach the place where the beam-supporter is located. Between these two elements there is unuseful space, which is an empty triangular-shaped space. Because of this reason, the useful space under the roof has a smaller area than the house's ground floor.

The structure mentioned will be screwed onto the double roof beams and onto the double ceiling beams (which are fastened to the top beam transversally, leaving a space between the supports #7H2, for circulation purposes). The longitudinal joists #7H4 extend from the double beams to the roof double beams and after being joined to the transversal joists, they help out in defining the internal structure modules, where roof beams are supported and joined together. These joists, as part of their structural function, also help avoid the flection of roof beams, and lighten the loads that push towards the ridge cap. They also will become part of the structure for the ceiling modules and the cover #7H5 for the vertical section of the walls. These sections can be covered with half-boards, triplex or plywood wood, plycem, gypsum, etc.

The bridge structure #7H1, right-side supports #7H2, and transversal joists #7H3 are also placed under the double beams.

The unuseful space, which has a triangular shape which is formed between the longitudinal joists and the beam-supporter, and is located under the ceiling beams, can be covered with ceiling modules. These modules will not be visible from below the structure.

If ceiling beams and floor modules are placed, the structure will form a usable space, known also as attic or garret, etc. As I mentioned before, this space can be used to increase the amount of usable space of the ground floor.

If the internal covering material covers the whole structure or structural support, the purlines #7H6, which can be installed optionally, will be visible. These purlines will join the longitudinal roof beams. These beams are the ones that jut out around 20 centimeters of the front and rear facades so that the roof can have an eave that will protect the facades.

These purlines are placed at both sides of the bridge. They are located between the right-side supports and under the roof beam. There can be others between the roof beams and the transversal joists and under the point where the beams meet at the ridge cap, providing additional support to the secondary union beams already described.

In this manner, the roof is property structured with the components described. We have also seen how it can be covered with any material internally and how the USEFUL SPACE UNDER THE ROOF can be made readily available to be used.

The dismounting process for this support structure has to be done carefully and systematically due to the great amount of components that are part of it. Probably the lengthiest process is the one concerning the mounting and dismounting of the structure. All of the components must be kept in good conditions, if possible, so that it won't be necessary to purchase new ones.

The roof can help out if the user decides to install pivot windows on top of it, or lateral windows can be created, with a small change in their design. In this way, the interior space can be illuminated, allowing more ventilation, and what is more important: without investing much more money, the total area for the ground floor and mezzanine will be 90 square meter of usable space. If the staircase is used to reach the first or upper floor, it means that the construction of this upper floor has been considered. In this way, the house will have two floor. With the installation of an additional staircase, the third floor or second upper floor can be accessed.

After changing the ground floor, if the upper floor has two bedrooms, and if the ceiling between the roof is used, instead of having two floors, we will obtain three floors: ground floor, upper floor, and mezzanine.

Ground Floor: 4.80 m. ×10.20 m. =48.96 sq. m. interior 55.12 sq.m. total

Upper Floor.: 4.80 m. ×10.20 m. =48.96 sq. m. Interior 55.12 sq.m. total

Mezzanine: 36 square meters (approximately) interior.

The first upper floor will have two bedrooms: the main one with 4.8 m. ×3.00 m. of free space (without considering the closet) and the smaller one with 3.65 m. ×4.0 m. including the closet. The bathroom will have the same size as the one on the ground floor. The circulation area that leads to the bigger bedroom will be larger. It decreases the space available for the smaller bedroom, but it is indispensable to do it this way.

Up to this point, and if the ground floor is not modified, we will have three bedrooms, a dining and living room, a kitchen, two complete baths, a service courtyard, an access staircase, a place for the washer, the dryer, and the out. Due to their structural components and to having modular roof components, these can be dismounted easily, as their building system is easily understood.

Each component can be dismounted separately. Among these elements, we can mention: the beam-supporter with spiral, the beams with structural rods, the roof connectors, the transversal secondary beams, the roof modules, the ridge cap cover, the inferior transversal joists, the water protector used for the roof beams, the rainwater gutter. Once the modular walls are erected and finished with their top beam, the roof which was dismounted can be reinstalled. The front and rear facade components, which are located between the roof and the ceiling, can also be dismounted. All of these are part of the whole prefabricated set which can be dismounted and assembled, which allows us to call this house: THE HOUSE THAT EXPANDS.

As we gain additional experience, we will be able to improve this system, and we will improve the manufacturing process of each component, combining the manufacturing technology with the building technology, with a mounting process that does not required specialized labor.

All of the exterior areas, such as gardens, pathways, porches, lighting systems, etc., are considered in the general design, but they will have extra costs. To be able to erect the house, it will be necessary to already have buried foundations, link-ups with services such as water and sewage, water heating tank. There is always the possibility of using the space between the ceiling and the roof, with which we will have a total of 128 square meters which are useful.

On the second floor, there will be a rather large family area, with a lot of light entering through the lateral and rear windows, which also allow light to enter the staircase to access this floor.

The main bedroom will have the following dimensions: 5.2 m.×4.80 m. =24.96 square meters, including a double closet, and a private bathroom. It will have two windows on the main facade and a lateral one. The family room will have these dimensions: 4.8 m.×3.0 m. =14.4 square meters. It can also have its own access to the space between the ceiling and the roof, or usable space. This space can be accessed from the family mom or from the closet area. These alternatives are considered as part of the design, but these options would have an additional cost.

Why do We call this Building "the House that Expands"?

We are including here a summarized description of the architectural conception, that is closely related to the constructive conception, which I will describe in the same manner, so that this "expansion" will be more easily understandable. Since all of its components are prefabricated, the structure of this house is composed of modular walls, that reach the top beam, and starting at this point new floors can be built. On this top beam, roof beams can be laid -corresponding authorizations, etc., because the actual components that are sold prefabricated include everything starting with the foundation beam up to the roof.

13. System Alternatives

Houses built in pairs

Horizontal expansion, either L-shaped, Unshaped, or other combinations

Sets of houses

A second home

Alternative uses for these buildings: for tourism, educational purposes, health facilities, houses for elderly persons, etc., and others.

Duplexes

Without a separation between them

With a separation between them.

The single HOUSE THAT EXPANDS, which has been described in this architectural proposal has many advantages: the area that surrounds it can be used by its owners exclusively, the general installations are controlled separately, and the interior space is completely independent.

THE HOUSE THAT EXPANDS and is part of a duplex without a separation has to share installations, structures, and surroundings, and thus looses its independence.

THE HOUSE THAT EXPANDS and is part of a duplex with a separation has a communal space, between its lateral walls, where there are only windows which increase the amount of light and which are used for bathroom ventilation.

This space between houses is required so that the rainwater, drainage, and exhaust system pipes can be placed externally. Since they are visible, they can be covered with a recorded metallic box.

But the shared space, which has the same area for each house, is more important as it is here where the solar energy systems (property.protected) will be installed. The components of this system are batteries, converters, inverters, cables, etc., that will be used if this "optional system" is installed. They will be easily accessed and maintained.

Since this system includes the "optional system" which is the solar energy system, it is necessary to describe the space that will be required for its basic components. The roof would be the most adequate space for placing the solar panels. These are exposed so that they can receive solar energy directly and then provide the inverters, batteries, etc. with the energy. The inverters, batteries and other components will provide the house with electricity, which will be of a continuous current type. This can be converted into alternating current of 110 or 220 volts. This type of current can fulfil the requirements of lighting, heating, ventilation, pumping, and communication systems.

This country has exceptional conditions for solar energy. The government should encourage the use of this clean, silent, nonpolluting, and free (if the cost of the equipment and maintenance is not considered) source of energy.

Sets of Houses

Townhouses

Privacy is in jeopardy. When we analyze townhouses or duplexes, it is obvious that these will be affected by the use of shared structures, installations, and communal spaces. But, on the other hand, there are also positive aspects: shared land use, maintenance costs are distributed, some facilities are shared such as meeting rooms, recreation areas, security systems, etc.

In this building system, we have taken into consideration, the possibility of building house complexes, tourism facilities, educational buildings, etc., all of which must fulfil communal requirements, and due to their architectural distribution, these requirements must be coordinated during the manufacturing and mounting process.

Many aspects of this system take into consideration all of the possible variations of the original scheme, which is why this aspect is known as the MULTIUSE aspect.

As part of the definition of the MULTIESPACIO 2000 (MULTISPACE 2000), MULTIUSO system, in the case of THE HOUSE THAT EXPANDS, the description of this aspect will contribute greatly towards the solution of different problems related to programs at different development areas.

A Second Home

This option is available to the people, who belong to the middle class and who have the highest income. The upper middle class is the one that can have this privilege, not to mention, the upper class, which is the one with the greatest amount of resources.

14. Space Alternatives

Construction of Tourism Facilities

These can resemble cabins and can be complexes with cabins in many different sizes: with one, two, three or four bedrooms. After only a short time after they are mounted, current requirements can be fulfilled as well as the current deficit. They can be erected at remote sites, where the beauty of the landscape has not been taken advantage of. By using the solar energy system, the building system can be installed with all of the basic services available, and they can even have, in these cabins, running water with the help of the water pumps. This will depend on the type of solar energy equipment to be used. In this way, the tourism industry can be developed at any accessible place in the country.

Construction of Buildings for Educational Purposes

One of the advantages of this system is that buildings can be erected quickly, which would allow classrooms to be built during vacations, for example.

Constructions of Houses for the Elderly

These can be used both by privileged people as well as non-privileged ones, who can access, use and enjoy these housing projects, which are a part of social services programs. The housing complexes can include emergency services, supermarkets, recreational areas, and meeting rooms, etc.

Construction of Buildings for Health Programs

It is possible to design and build small hospitals, both rural as well as remote ones, with the help of the current construction system, since it is prefabricated, easily transported, and easily erected. In this way, it will be possible to solve the problems of providing hospitalization services to any place in the country.

Different Alternatives, Solutions and Possible Applications

As you can deduct, this invention can be used for many purposes, not only to build houses. It uses different types of systems, as well as sharing structural components with other systems, creating new "hybrid systems". It also supports the development of tourism, solves the problems related to spaces needed for educational purposes, and contributes towards the enjoyment of new spaces, depending on how it is used and of the requirements. It is a MULTIESPACIO 2000 (MULTISPACE 2000), which takes into consideration the use of solar energy technology, recycling technology, thermic technology, etc., all of which will continue to expand into new fields.

15. Technical Study: (These technical data can be modified when the structural calculations are made.)

Buried Foundations

1. If the structure's floor is distributed over a large area, the load supported by the foundation's base, per square meter, is decreased.

2. The buried foundation covers a larger area than the visible beam and also a larger area than the walls. This gives the structure a greater stability, helps main other components standing vertically, reduces the inferior pressure or load, and also helps to resist transversal forces that push upwards.

3. The loads per unit, which exist on the foundation's base, are usually smaller than the loads that can exist on the construction lot, since the double mw of stones transmits these loads and their reactionary forces to the base to which the foundation has been cast with the concrete.

Eventually, the stones can be replaced with Cyclopean concrete over the base. Since this will constitute a single continuous element, the whole foundation will act as a "continuous beam".

| Thickness | House's Height | Height of the Stone Rows | Resistance to Compression |
|---|---|---|---|
| 50 centimeters | 2 floors | 20 to 40 centimeters | 150 kilograms/centim.$^2$ |
| 50 centimeters | 3 floors | 20 to 40 centimeters | 150 kilograms/centim.$^2$ |

The self-bearing foundation structure, columns-walls, and beams can have the following characteristics:

Foundation Beam

This beam is placed on the stone foundation. It is made out of reinforced concrete and is fastened to the plinth columns with the help of anchoring structures, so that the components will have continuity. This union of components is rigid and acts correctly whenever there is flection. It can either be prefabricated or manufactured at the construction site.

Block Production

Molding and vibration systems: block-making machines can be used to manufacture the blocks, which can have different designs. The blocks have the following characteristics:

| | Physical Characteristics |
|---|---|
| Basic wall block | Resistance and stability |
| | Mechanical Characteristics |
| Wall half-block | Resistant to rupture by compression |
| | Thermic Characteristics |
| Corner-column block | K Coefficient 0.40 w/square meter *C |
| | Resistance to Rain |
| Corner-column block | Does not allow rain to seep through or rain is stopped from seeping through due to the block's composition. |

Extrusion and casting systems: These systems will be used to manufacture the central lightened part of the wall blocks, by using cement-like mixes made by recycling agricultural products (rice hull, coconut or sugar cane bagasse, soy waste products, etc.) or with natural products such as sawdust, or with plastic products such as the estiropor.

If both manufacturing processes are combined, we will obtain as a result a new type of block. On its exterior or interior walls, it will be composed of concrete, while in the center it will have insulating lightened concrete. This insulation effect will work both during cold and warm weather in places where there are the four seasons.

To begin the manufacturing process, we will first mix cement and aggregates, in a traditional way, to produce blocks with great solidity, such as the ones used in walls. The basic component will be cement of the Portland type. These blocks have the following characteristics:

They neither dilate nor contract.

They do not tend to rupture

Mortar mix and structural rods can be used to build columns every 60 centimeters.

They are insulating, especially if recycled aggregates are used.

They can be interlocked and adjusted easily during their layout and they can be fastened to columns.

These are the proportions used: 1 unit of cement, 3 of sand, 6 of agglomerates Mix: 1:3:6 Cement=1334/(1+3+6)= 133 decimeters 3 sand 399 decimeters 3, aggregates 798 decimeters 3) 1334 is a number determined by the experience obtained when creating concrete mixes.

| CONCRETE COMPOSITION (M3) FOR WALL AND COLUMN BLOCKS | | | | | | |
|---|---|---|---|---|---|---|
| | | | | | Weight in kilograms | |
| Proportions | | | | Block | ½ Block | COLUMN |
| Cement | 1 | Density | 350 kilogr./m.³ | 5 kilograms | 21/2 | 21/2 |
| Sand | 3 | Thermic conductibility | 0.088 kcal./mhc | This weight is according to the measures and volume. | | |
| Aggregates | 6 | Noise absorption | 15 dB | | | |
| Water (enough) | | Resistance to compression | 19 kg/cm² | | | |
| | | Adherence to supports | 2.7 bars/cm.² | | | |

Thin 0 millimeters interior face
Thick 0.13 millimeters exterior face

If lightened mixes are used, the greatest volume is occupied by this, as aggregates such as: sawdust, rice hull, sugar cane bagasse, coconut bagasse, and other agricultural waste products that have been recycled.

Top Beam

This is a continuous structure between walls and columns.

| Transversal to section | height cm | length ml. | with structure weight kilograms/ml | kilograms/cm.² resistance to compression | PSI Floor Loads |
|---|---|---|---|---|---|
| 13 | 4.80 | 10 | 35 | 1 | 150 |
| 13 | 1.80 | 10 | 46 | 2 | 120 |
| 13 | 3.00 | 10 | 40 | 3 | 100 |

Roof Structure

This is an integrated system and an Industrial proposal that surpasses traditional building processes.

The structure is composed of two parts: the interior structure and the beams, roof modules and finishing products for the roof, and the anti-seismic beam-supporter bearing.

This structure can have the following technical characteristics:

Building features which can be joined easily
Light-weight components
Components can be mounted and dismounted quickly
Thermic insulation
Acoustic insulation
Water-proof
Components are modular and can be anchored easily The 45-degree slope is a consequence of the fact that the main roof beams are double when they reach the point where they are supported by corner and intermediate columns.

Internally, under the double roof beams and over the ceiling fastening double beams, a bearing and supporting structure will be formed. This structure will bear and support the main roof beams.

After installing the structure that consists of right-side supports, bridge, and joists (placed between the double beams), the remaining single roof beams will be joined with connectors, at the upper part. The secondary beams, which extend from connector to connector, form the ridge cap, which Is located over the pinnacle's longitudinal purline.

Longitudinal joists are located under the beams and between the transversal structures. These joists will hold and support single beams, that are located every 60 centimeters.

The top beams are located at a place that begins with the roof beams. They are fastened to these with the structural rod of the column-block and wall block, by the beam-supporter that has an adjustment spiral, by the cover (which goes between beams), and by the internally fastened connectors.

These connectors are fastened to the beam by means of a nut and a pressure ring.

WORK LOADS (in Kilograms/centimeters², approximate values)

| Type | Double beam | Single beam | Longitudinal joist/ml | Transversal joist |
|---|---|---|---|---|
| Flection | 1265 Kg/cm² | 1050 Kg/cm² | 185 Kg/cm² | 69.5 Kg/cm² |
| Compression | 1406 Kg/cm² | 1150 Kg/cm² | 83 Kg/cm² | 117 Kg/cm² |
| Traction | 1125 Kg/cm² | 900 Kg/cm² | 100 Kg/cm² | 1150 Kg/cm² |
| Sharp effort | 703 Kg/cm² | 50 Kg/cm² | 1.4 Kg/cm² | 1.7 Kg/cm² |

The transversal joist structure is fastened to the roof beams by screws and a bridge that allows the loads to be balanced on the roof, in general.

16. Summation of Invention

In summary, the invention relates to a building system of various parts making up three subsystems including visible foundations, structural walls and a dismountable roof.

More particularly, visible foundation beams are structural elements which consist of reinforced concrete structures, threaded rods, which will have connectors that will fit with the structural wall rods. If the second or third floor are added, then a whole single structure will exist beginning with the foundation until the top. On this foundation beam the floor beams will rest, and over these modules will be installed. These can then be used for thernic systems.

On the foundation beam and buried foundation, a rubber bearing (which resembles a bridge) will be help to absorb vibrations and seismic movements, making this type of foundation something unique.

Walls, floors, and ceilings are different as walls are composed of a set of 10 different types of blocks, that perform different structural functions and are used for different types of installations. The structural function that they have is that they will support, by means of their ducts, rods that are connected to the foundation, and with the mortar cast will form a single structural element, such as a column. Through the empty ducts and other ducts mentioned, electricity cables, sanitary installations, solar energy installations, and others, can be inserted. Narrower ducts can be used to install structural rods, in cases where this might necessary. In the block's extremes, the half-duct can be used to join it with other blocks, and to interweave these together, as additional rows are erected. In this way, structural functions, such as the ones already described, are performed.

When blocks are used to border window or door frames, these will be anchored to the windows and doors and the same thing will happen when blocks are placed at walls' extremes.

It is very important to indicate that each block has both ducts and upper channels. The latter exist both on the external and internal sides of the blocks, and on the bottom and top. The channel on the exterior side is used to place a rubber bearing which stops humidity, wind, and water from seeping through between the blocks. The interior channel is used to install water cables, electricity cables, phone cables, etc. Once the blocks have been laid out these channels are formed in each row.

The amount of cabling saved is quite large. The possibility of using any of the channels of the block rows, both internally as well as externally, makes this system, along with what has already been described regarding the structure, a unique system of self-bearing walls, that allow a wide variety of installations to be made. This walls system also permits solar energy systems, as well as cooling and heating systems for interior spaces, to be installed.

Over these walls, once erected, top beams will rest and they will allow the structure to be fastened to them.

The roof is dismountable since the roof system consists of a rubber beam-supporter. Within it, there is a spiral and a connector that absorb vibrations and seismic movements. The connector is also used to connect the structural threaded rod to the next floor, since on the extremes of the column blocks a fastening double beam and double roof beams are set. They for a single modular axis which begins with the foundation. There are also fastening bolts that join the spiral, the connector, and the column block with those beams. In this way a dismountable structure is formed.

Between the roof beams, there is a beam cover with a triangular connector that fastens them.

The connectors, which are multi-facetic, join and support, on the top section, the double roof beams, the single beams, and the joining beams. They are designed to support roof beam forces. This allows the system to be completely dismountable, and reusable in the rest of the floors.

The system described regarding the part below the roof beams, and over the ceiling beams, has a structure, that support the roof structurally. This structure is composed of bridges, right-side supports, transversal and longitudinal joists. All these elements are mountable and dismountable and secure the roof completely.

The roof beam design, with lateral tabs, allows modules to be glided until they are anchored onto the roof modules. In this way, the dismounting and mounting system for this roof is completed.

Two glasses can be placed in especially designed windows, made out of plexiglass, and in this way noise levels are reduced, and sudden temperature changes are not felt so acutely.

The floor and ceiling modules are prefabricated at the factory so floors and ceilings can be laid out in a few minutes.

Over the roof modules, solar energy systems can be installed, along with converters and inverters, that change continuous current to alternating current. These components can use the empty wall ducts, through which warm or cold air can flow into interior spaces, and then flow out through a grid which is located on the floor skirting.

The most important components of the system have been described, which is why this system can be considered a multisystem with multiuses, which is also unique and different from the rest of traditional and already known systems.

Contents

1. FIELD OF THE INVENTION
2. BACKGROUND OF THE INVENTION
3. OBJECTIVES AND ADVANTAGES
4. BRIEF SUMMARY OF THE INVENTION
5. BRIEF DESCRIPTION OF THE DRAWINGS OF THE SYSTEM WITH STRUCTURAL DRAWINGS
6. DETAILED DESCRIPTION OF THE BUILDING PROCESS
7. SUMMARY OF ENUMERATED COMPONENTS BY SECTION
8. EXPANSION ALTERNATIVE
9. SOLAR ENERGY, RECYCLING AND AGGREGATES
10. HYBRID COMBINATIONS
11. PREFABRICATED SYSTEMS
12. ARCHITECTURAL PROPOSAL
13. SYSTEM ALTERNATIVES
14. SPACE ALTERNATIVES
15. TECHNICAL STUDY
16. SUMMATION OF INVENTION
17. CLAIMS

What is claimed is:

1. A modular building block for use in a building system, said block having top and bottom surfaces, opposed interior and exterior sides, and opposed ends, said block having a recess extending from the top to bottom surfaces and inwardly at each end, said top and bottom surfaces being complementary in shape for interfitting, with one of said top and bottom surfaces having a ridge portion extending the length of said block and the other of said top and bottom surfaces having a groove portion complementary to said ridge portion, whereby when a plurality of said blocks are assembled horizontally and vertically with ridge portions and groove portions of vertically adjacent blocks interfitting to define a wall, said block end recesses define a plurality of vertically oriented ducts adapted to accept structural rods and mortar in selected ones of said ducts to form support columns, and to accept utility conduits in selected others of said ducts without rods and mortar characterized wherein said ridge portion and said groove portion are centrally located on said top and bottom surfaces and said block includes a first channel and a second channel on either side of said recesses along the top and bottom surfaces which channels extend from end to end generally parallel to but laterally inwardly of said interior and exterior surfaces and laterally outwardly of said ridge portion and said groove portion, said first channel being inwardly of said exterior side of said block and said second channel being inwardly of said interior side, said first channel being smaller in cross section than said second channel and adapted to accommodate sealing means, and said second channel inward of said interior side adapted to accommodate a utility cable whereby when said blocks are assembled, said first channels of horizontally adjacent blocks define means for accommodating sealing means for sealing out weather elements, and said second channels of horizontally adjacent blocks define conduits for utility cables.

2. The modular block of claim 1 wherein there is a central through aperture from top to bottom in longitudinal alignment with said block end recesses.

3. The modular block of claim 1 wherein said block has at least one bore running vertically through the block between the second channel of the top surface and second channel of the bottom surface.

4. The modular block of claim 2 wherein said block has at least one bore running vertically through the block between the second channel of the top surface and second channel of the bottom surface.

5. A modular building system for a building, including a visible foundation comprising structural beam elements of reinforced concrete having a plurality of foundation rods extending upwardly therefrom, a plurality of modular blocks for forming walls of said building extending upwardly from said foundation beam elements, said blocks having vertical apertures therethrough and adapted to be assembled into said walls such that a plurality of vertical ducts are formed in said walls by the apertures of adjacently assembled blocks, wall rods having upper and lower ends, the lower ends of said wall rods being connectable to said foundation beam rods at selected locations thereof and adapted to extend upwardly through selected ones of said assembled wall ducts, at least some of the wall rods being of a height where the upper ends are exposed above, an assembled wall, modular floor beams and means for connection of said floor beams to said visible foundation beam elements, and modular first ceiling beams for extending between side walls of the building, said ceiling beams adapted for support and connection to said walls in association with the exposed upper ends of said at least some of said wall rods, and a roof structure formed of modular beams for connection with said walls in association with the exposed upper ends of said at least some of said wall rods, characterized wherein means demountably connects said roof structure to said walls whereby said roof structure is removable from an assembled building whereby said walls may be extended upwardly by additional said modular block to form a second level, said first ceiling beams forming support for modular flooring of said second level, and said roof structure can be mounted on said extended walls, and further comprising modular wall corner blocks, modular flooring, windows, doors to complete and enclose said building according to a predetermined design, and further characterized wherein said modular wall blocks have top and bottom surfaces, opposed inner and outer sides and opposite ends, said top and bottom surfaces having complementary recess and protrusion configurations for interfitting vertically adjacent blocks, and wherein said modular wall blocks each have a channel in each of the top and bottom surfaces, each said channel being inwardly adjacent said outer side whereby when blocks are assembled to form a wall, said channels of adjacent blocks form a conduit for containing means to seal said walls from elements of weather.

6. The building system of claim 5 wherein each said modular block further have second channels in the top and bottom surfaces inwardly adjacent said inner side whereby when said blocks are assembled to form a wall, said second channels of adjacent blocks form means for selectively containing utility conduits for the building.

7. The building system of claim 6 wherein said block further has at least one bore running vertically through said block between said second channel of the top surface and the second channel of the bottom surface.

8. The building system of claim 5 wherein said roof structure includes vibration dampening beam supports connected to said exposed upper ends of said at least some of said wall rods.

9. The building system of claim 5 wherein said wall rods have threaded ends and further comprising, threaded connectors for extending said wall rods to selected lengths.

10. The building systems of claim 9, wherein each said visible foundation beam elements include a further rod formed therewith, said further rod having an upper end for connection with a floor beam through a threaded connector.

11. The building system of claim 10, further including means for connecting said modular floor unit to said floor beam.

12. The building system of claim 5 further including rubber bearing means for separating said visible foundation beams elements from buried foundation means on which said visible foundation beams elements may be placed.

13. The building system of claim 5 wherein said roof structure is of "A" frame configuration and further includes space covers for connection between adjacent beams of said roof structure to cover spaces between said beams of said roof structure and said adjacent assembled wall, and further including facade elements to close in ends of said roof structure.

14. In a method of constructing a building which can be expanded upwardly as desired, the steps comprising:
providing a plurality of visible foundation beams to form a foundation for the building, said foundation beams including foundation rods extending upwardly therefrom at selected locations;
providing a plurality of modular wall blocks for assembly on said foundation beams in a selected configuration to form walls of said building, said modular blocks each comprising a channel in each of top and bottom surfaces thereof, said tot) and bottom channel being inwardly adjacent an outer side of each of said modular blocks, said top and bottom channel forming a conduit for containing a sealing means for sealing a wall formed from said plurality of blocks from the elements, certain of said modular wall blocks being formed such that window and door apertures can be defined as desired, said modular wall blocks having vertically oriented apertures therethrough and assembled such as to define vertical ducts in an assembled wall;
providing a plurality of wall rods and connection means for connecting said wall rods to said foundation rods, said wall rods extending upwardly through selected ones of said wall ducts, at least some of said wall rods having upper ends exposed above an assembled wall;
providing ceiling beam holder boxes having means for connection with said exposed upper wall rod ends, of opposed side walls of said building;
providing ceiling beams for cooperation with said ceiling beam holder boxes and means to connect said ceiling beams to said beam holder boxes; and,
providing a demountable roof structure for connection to assembled building walls, through connector means and said exposed upper wall rod ends, whereby said building can be upwardly expanded by removing said roof structure and extending said wall rods and walls upwardly to define a second story on which said roof is again detachably mounted.

15. The building method of claim 14 wherein said roof structures are of "A" frame configuration and further comprises providing an "A" frame shaped facade for closing front and back portions of said roof structure and providing means for connecting said facades to said roof structure.

16. The building method of claim 14 further comprising providing floor beams and providing means for securing said beams to visible foundation beams, said means for securing comprising additional rods formed with said foundation beam and extending upwardly for connection with said floor beam.

17. The building method of claim 16 further including providing floor modular units for forming a floor and providing means for connecting said floor modular unit to said floor beams.

18. The building method of claim 17 wherein when said building is expanded upwardly, providing additional ceiling beams for the extended walls, providing additional flooring modulars for connection with the first ceiling beams, providing staircase means between said first level and said additional level, and providing additional window units in accordance with a predetermined design for said second story.

* * * * *